(12) United States Patent
Yamamoto et al.

(10) Patent No.: US 6,201,239 B1
(45) Date of Patent: Mar. 13, 2001

(54) OPTICAL ENCODER

(75) Inventors: Eiji Yamamoto, Ome; Hiroshi Miyajima, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/196,055

(22) Filed: Nov. 20, 1998

Related U.S. Application Data

(63) Continuation-in-part of application No. 09/006,668, filed on Jan. 13, 1998, now abandoned.

(30) Foreign Application Priority Data

Jan. 21, 1997 (JP) .................................................... 9-008377
Jan. 20, 1998 (JP) .................................................. 10-008576

(51) Int. Cl.$^7$ ................................................. G01D 5/347
(52) U.S. Cl. ...................................... 250/231.14; 356/373
(58) Field of Search ...................... 250/231.13, 231.14, 250/231.16, 237 G, 237 R; 356/373, 374, 375; 257/79, 80, 81, 82

(56) References Cited

U.S. PATENT DOCUMENTS 3,881,113 * 4/1975 Rideout et al. ...................... 250/551
5,129,725 * 7/1992 Ishizuka et al. ...................... 356/374
5,671,052    9/1997 Kawakubo et al. .
5,991,249 * 11/1999 Lee ..................................... 369/44.42
6,020,585 * 2/2000 Shimonaka et al. ............. 250/231.13

FOREIGN PATENT DOCUMENTS 7-306058    11/1995 (JP) .

* cited by examiner

Primary Examiner—John R. Lee
(74) Attorney, Agent, or Firm—Frishauf, Holtz, Goodman, Langer & Chick, P.C.

(57) ABSTRACT

In an optical encoder, in a case where a distance between the movable scale and a light beam emission plane of the surface emitting laser light source along a center axis of the light beam is L, a wavelength of the light beam is $\lambda$, a scale pitch of the movable scale is p, an angle between a pitch direction of the movable scale and a plane perpendicular to the center axis of the light beam is $\theta$, and an opening width of the surface emitting laser light source along a direction in which the pitch direction of the movable scale is projected on the plane perpendicular to the center axis of the light beam is $\underline{a}$, a relationship, $p \cdot \cos\theta < a$, is satisfied when $L \leq 1.0 a^2/\lambda$.

8 Claims, 29 Drawing Sheets

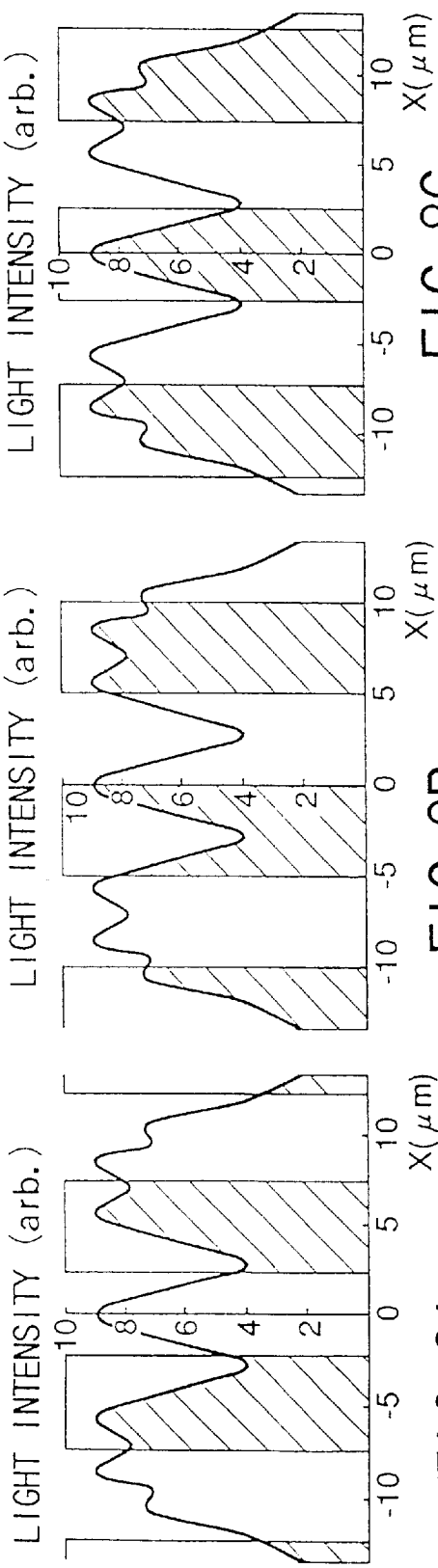
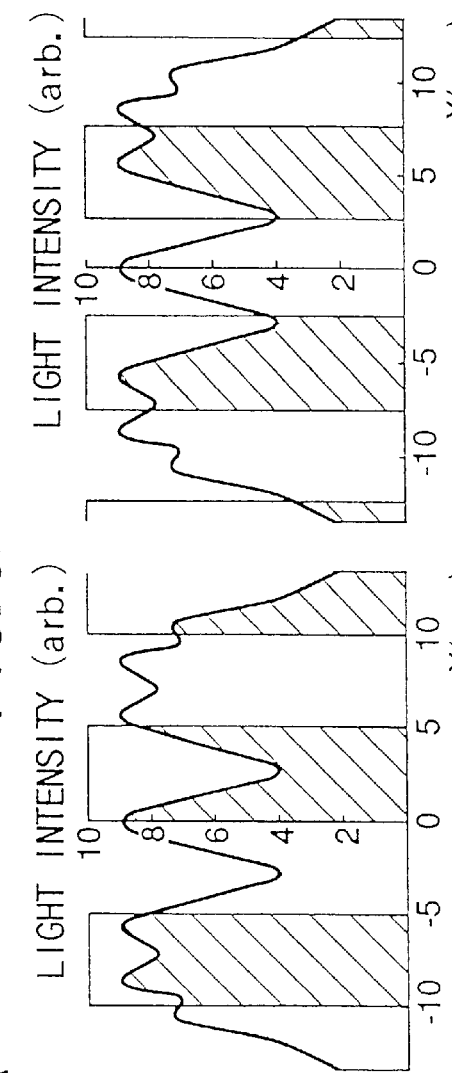

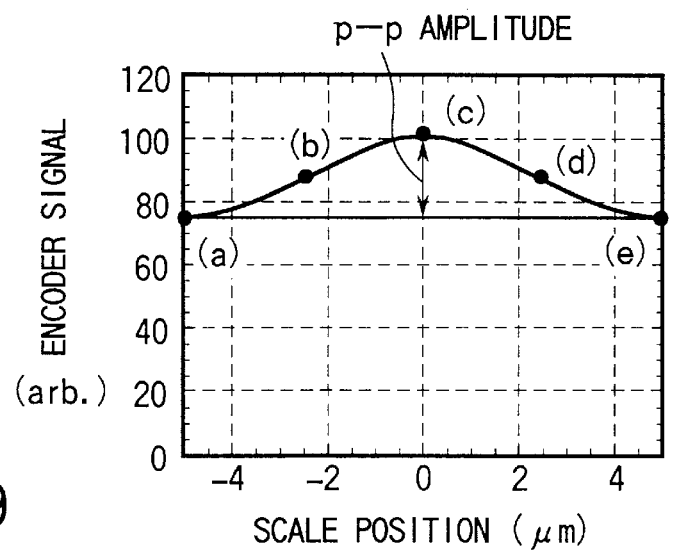
FIG. 9
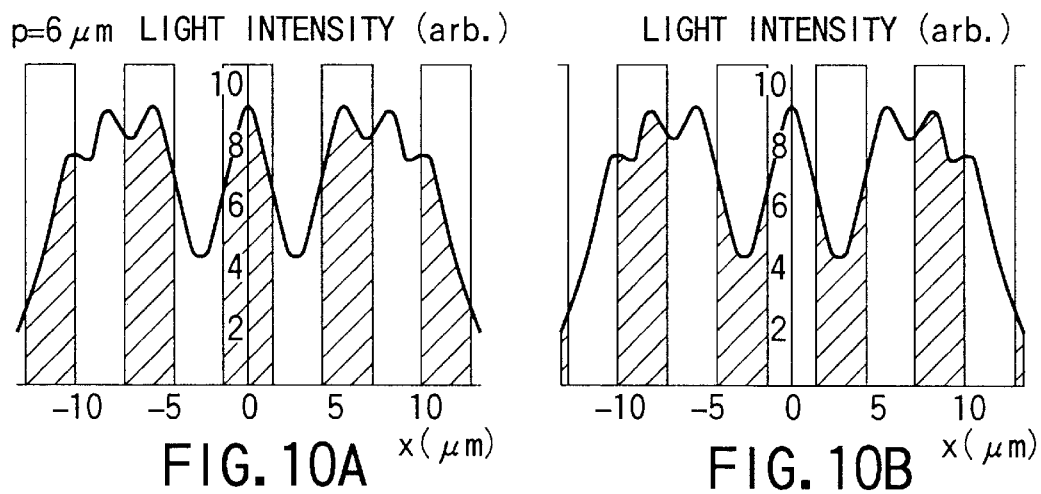
FIG. 10A
FIG. 10B
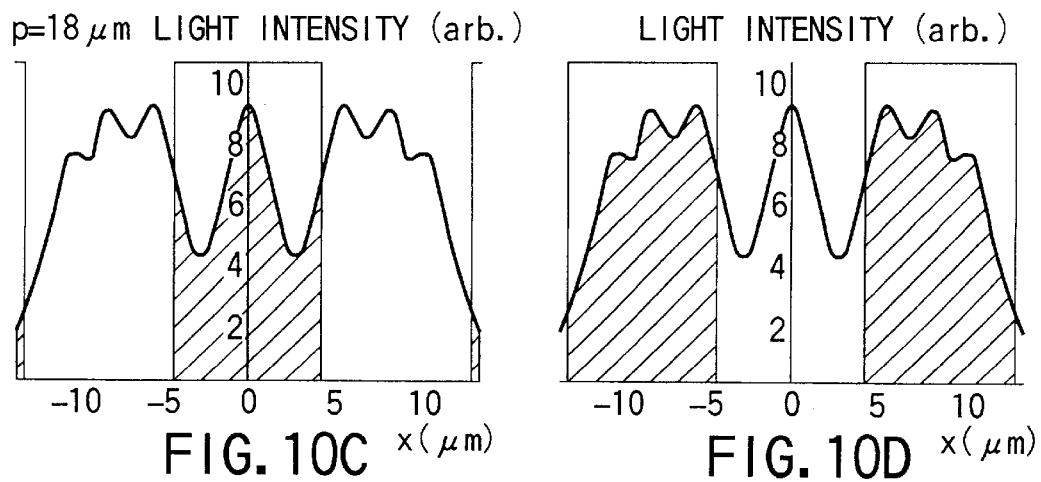
FIG. 10C
FIG. 10D

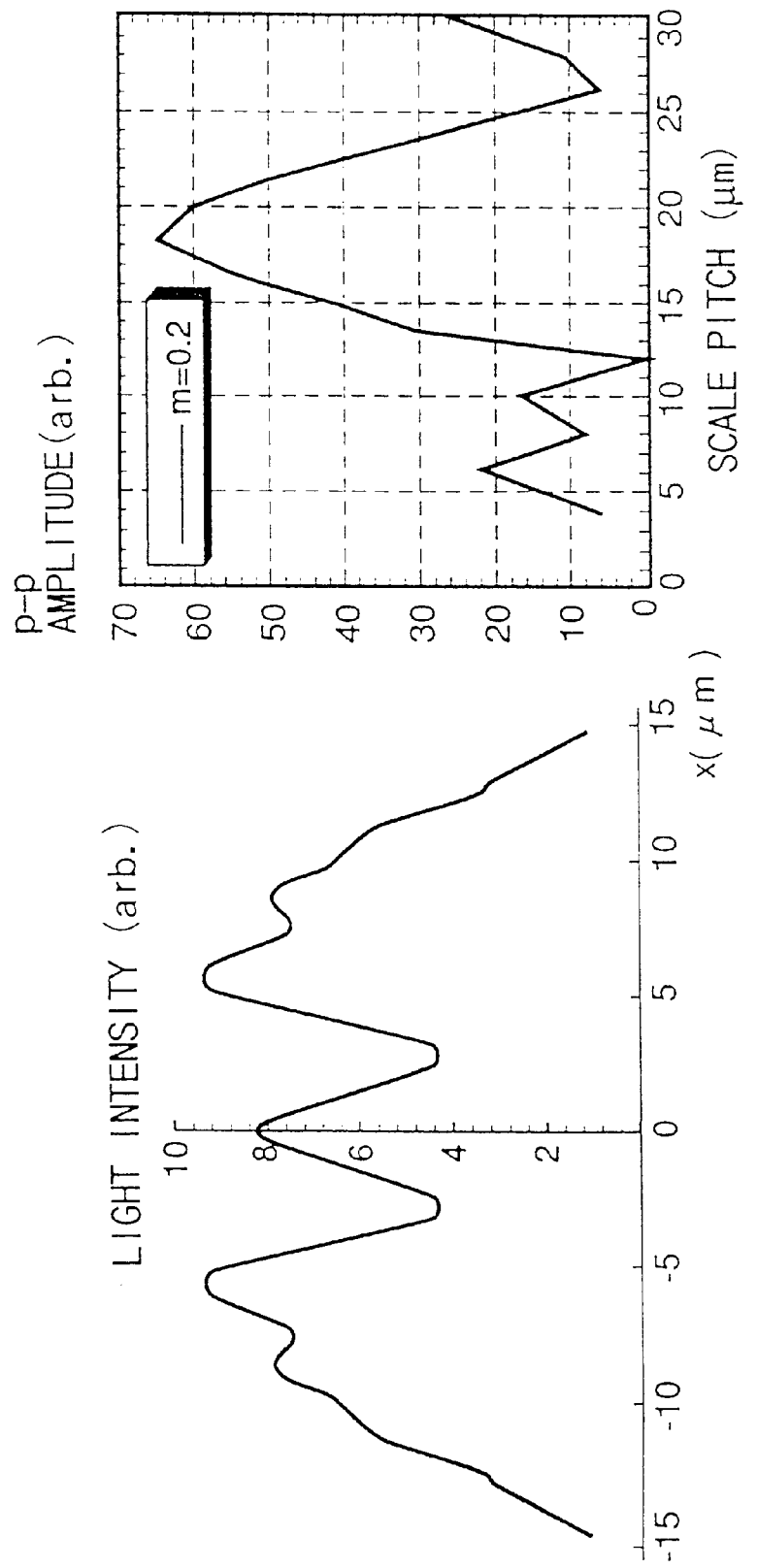

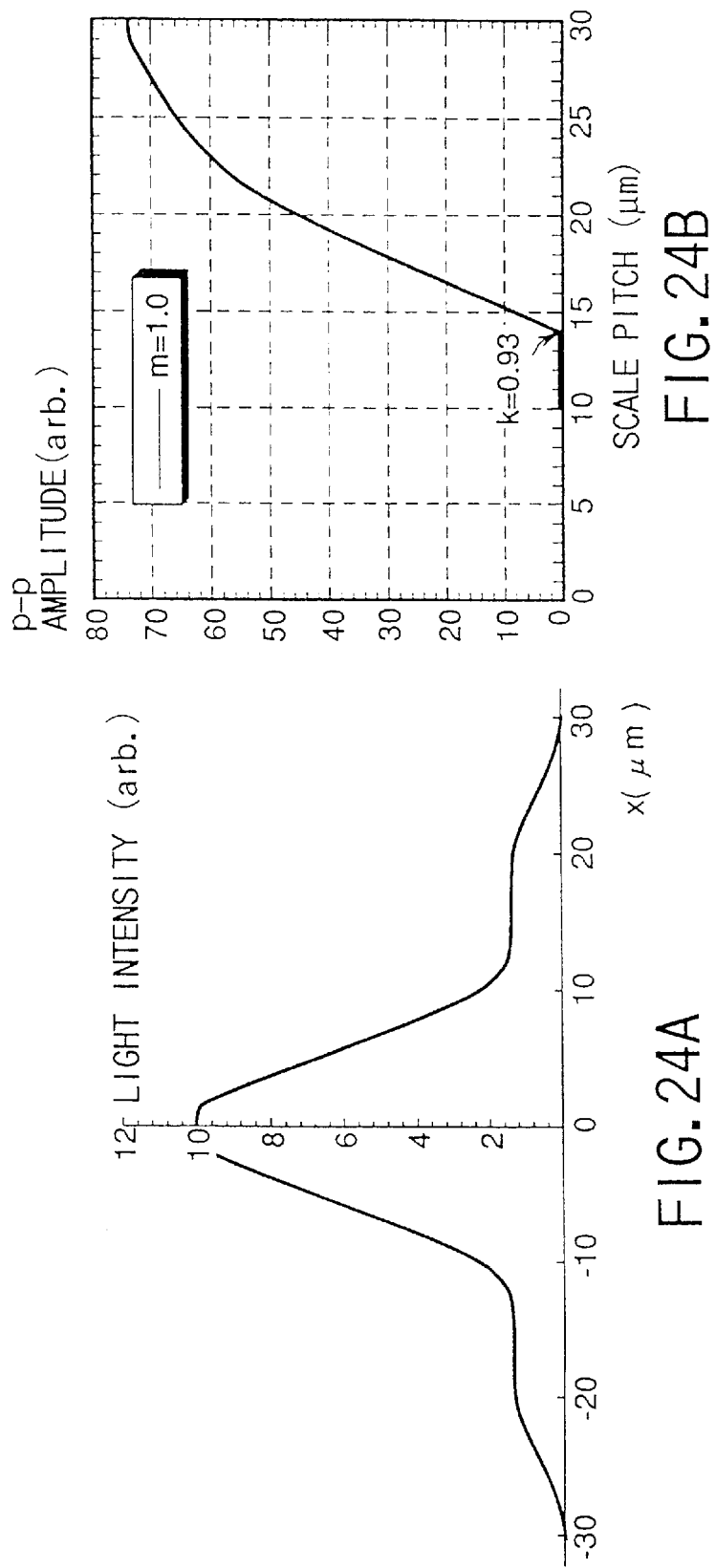

OPTICAL ENCODER

CROSS-REFERENCE TO RELATED APPLICATIONS

This is a Continuation-in-Part application of U.S. patent application No. 09/006,668 filed Jan. 13, 1998, now abandoned the entire contents of which are incorporated herein by reference.

BACKGROUND OF THE INVENTION

The present invention relates to an optical encoder for use in detecting an amount of movement of a movable portion of an apparatus.

It has been difficult to reduce the size and cost of a conventional optical encoder, since various optical components need to be assembled and adjusted. The applicant of the present invention, on the other hand, has developed an optical encoder which has a surface emitting semiconductor laser (hereinafter referred to as "surface emitting laser") as a light source and which permits reduction in size and cost.

FIG. 32 shows the structure of an optical encoder having the surface emitting laser developed by the applicant as a light source. In this optical encoder, when a beam has been radiated onto a scale 20 from a surface emitting laser 10, the beam reflected from or passing through the scale 20 is detected by a photodetector 30, 30'.

In general, the surface emitting laser has a smaller widening angle of an emission beam, which is determined by an emission window width (opening length) $a$, than a conventional edge-emitting semiconductor laser. Accordingly, the optical encoder developed by the applicant does not require a collimator lens or an index scale, which is needed in the conventional optical encoder. Thus, the size and cost of the optical encoder developed by the applicant can be reduced.

In the optical encoder using the conventional surface emitting laser, it is supposed that when a distance L between a light source and a scale is less than a predetermined distance ($a^2/\lambda$), the size of the optical spot formed on the scale by the surface emitting laser is substantially equal to an opening width $a$ in the scale pitch direction of the emission window of the surface emitting laser. Thus, there is no choice but to limit the value of the scale pitch p to $p \geq a$. In addition, since it is supposed in the prior art that the size of the optical spot formed on the scale is substantially equal to $L\lambda/a$ when $L > a^2/\lambda$, the scale pitch p is limited to $p \geq L\lambda/a$. It has not been considered to more decrease the value p.

On the other hand, an increase in resolution of the encoder has still been demanded in order to achieve a higher performance of a machine tool, a measuring device, etc. High resolution is indispensable for small-sized, low-cost optical encoders.

BRIEF SUMMARY OF THE INVENTION

The object of the present invention is to provide an optical encoder using a surface emitting laser, wherein when a light source and a scale are situated relatively close to each other, the scale pitch can be made less than that in a conventional optical encoder.

In order to achieve this object, in the optical encoder according to the present invention, in a case where a distance between the movable scale and a light beam emission plane of the surface emitting laser light source along a center axis of the light beam is L, a wavelength of the light beam is $\lambda$, a scale pitch of the movable scale is p, an angle between a pitch direction of the movable scale and a plane perpendicular to the center axis of the light beam is $\theta$, and an opening width of the surface emitting laser light source along a direction in which the pitch direction of the movable scale is projected on the plane perpendicular to the center axis of the light beam is $a$, a relationship, $p.\cos\theta < a$, is satisfied when $L \leq 1.0a^2/\lambda$, or a relationship, $p.\cos\theta < L\lambda/a$, when $L \geq a^2/\lambda$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 8A to 8E show variations in reflection light amount, which occur when the scale with p=10 μm has been moved, hatched areas indicating areas of portions needed to find the reflection light amount (i.e. hatched areas not indicating cross sections);

FIG. 9 shows variations in reflection light amount when the scale with p=10 μm has been moved by one pitch;

FIGS. 10A and 10B show variations in reflection light amount, which occur when the scale with p=6 μm has been moved hatched areas indicating areas of portions needed to find the reflection light amount (i.e. hatched areas not indicating cross sections);

FIGS. 10C and 10D show variations in reflection light amount, which occur when the scale with p=18 μm has been moved hatched areas indicating areas of portions needed to find the reflection light amount (i.e. hatched areas not indicating cross sections);

FIG. 11A is a light intensity distribution in the case of $L = 0.1a^2/\lambda$;

FIG. 11B is a graph showing a relationship between a scale pitch and a p—p amplitude in the case of $L=0.1a^2/\lambda$;

FIG. 24A is a light intensity distribution in the case of $L=0.5a^2/\lambda$;

FIG. 24B is a graph showing a relationship between a scale pitch and a p—p amplitude in the case of $L=0.5a^2/\lambda$;

DETAILED DESCRIPTION OF THE INVENTION

Figure 1:
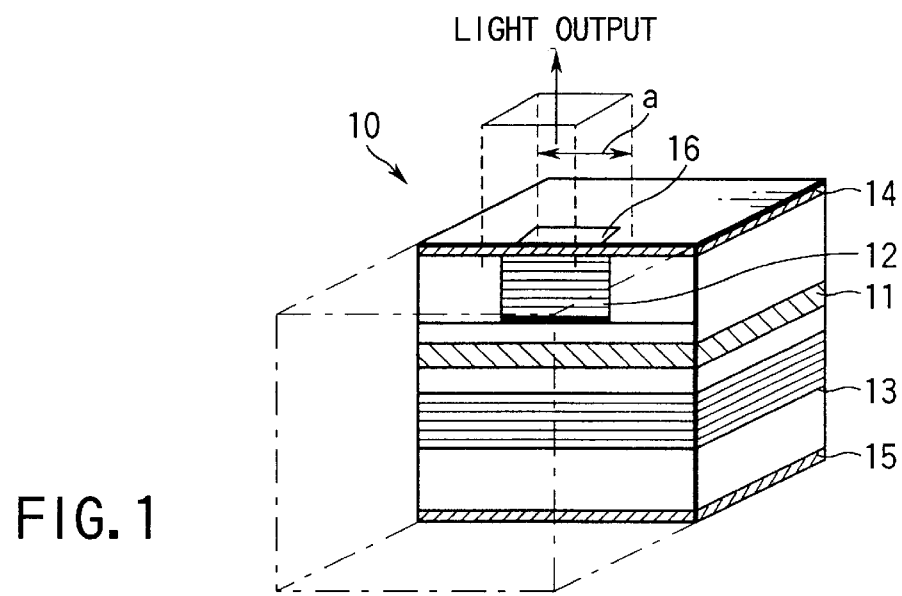
FIG. 1 shows the structure of a surface emitting laser applied to an embodiment of the present invention.

FIG. 1 shows an example of the structure of a surface emitting laser 10 used as a light source in an embodiment of the present invention.

As is shown in FIG. 1, the surface emitting laser 10 comprises an active layer (light emission layer) 11, multi-layer thin-film mirrors 12 and 13 provided on both sides of the active layer 11, and upper and lower electrodes 14 and 15 which sandwich the multi-layer thin-film mirrors 12 and 13.

In the surface emitting laser 10, a voltage is applied to the upper and lower electrodes 14 and 15, thereby injecting a current into the active layer 11 and causing the active layer 11 to emit light.

Specifically, a resonator is constituted by the active layer 11 and multi-layer thin-film mirrors 12 and 13 in the film-thickness direction. Thus, oscillation occurs in the film-thickness direction. Only in a region of the opening 16 from which light is emitted, is the upper electrode 14 removed. Accordingly, light is emitted in a direction perpendicular to the surface of the film, as shown in FIG. 1.

The surface emitting layer 10 is formed, for example, of GaAs which is applied to, e.g. the active layer 11, or of a p-type or n-type GaAs/AlGaAs lamination film which is applied to the multi-layer thin-film mirrors 12 and 13.

The surface-emitting laser 10 having the above structure has an advantage in that the shape of the opening 16 (light emitting opening) can be freely designed by patterning the upper electrode 14. In the case of using bottom-side emission light, the lower electrode 15 is patterned.

The degree of widening of the emitted beam is determined by the shape and size of the opening 16. Specifically, since the beam widens due to diffraction caused by the opening 16, the degree of widening of the beam can be limited to a relatively small level by properly determining the shape and size of the opening 16. Thus, if the properly designed surface emitting laser 10 is used as a light source of the encoder, a collimator lens (or a light collecting lens) or an index scale, which is widely used in the conventional optical encoders, can be dispensed with, and a very small, low-cost optical encoder can be obtained.

Figure 33A:
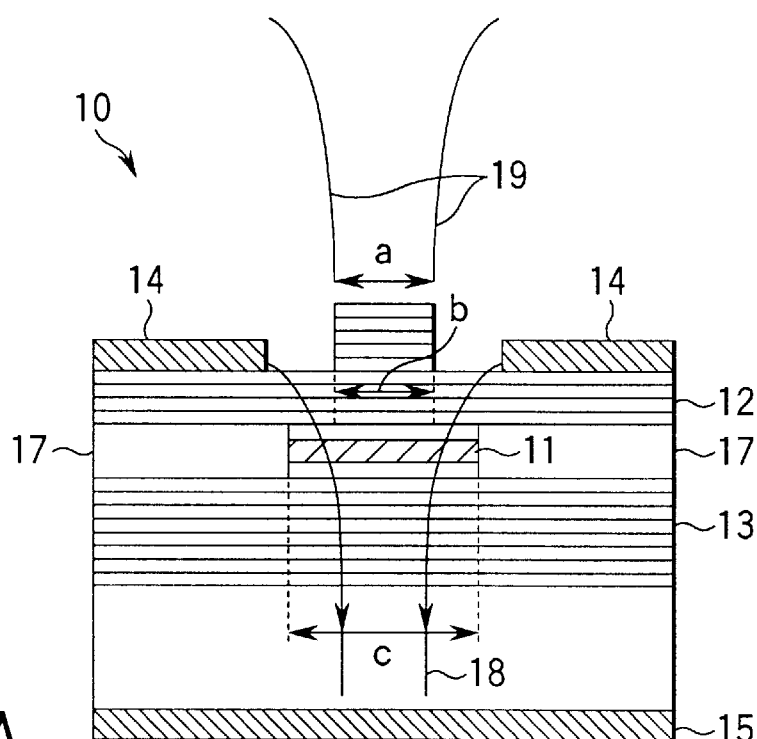
FIG. 33A is a cross-sectional view showing the structure of a surface emitting laser according to a first modification of the invention.
Figure 33B:
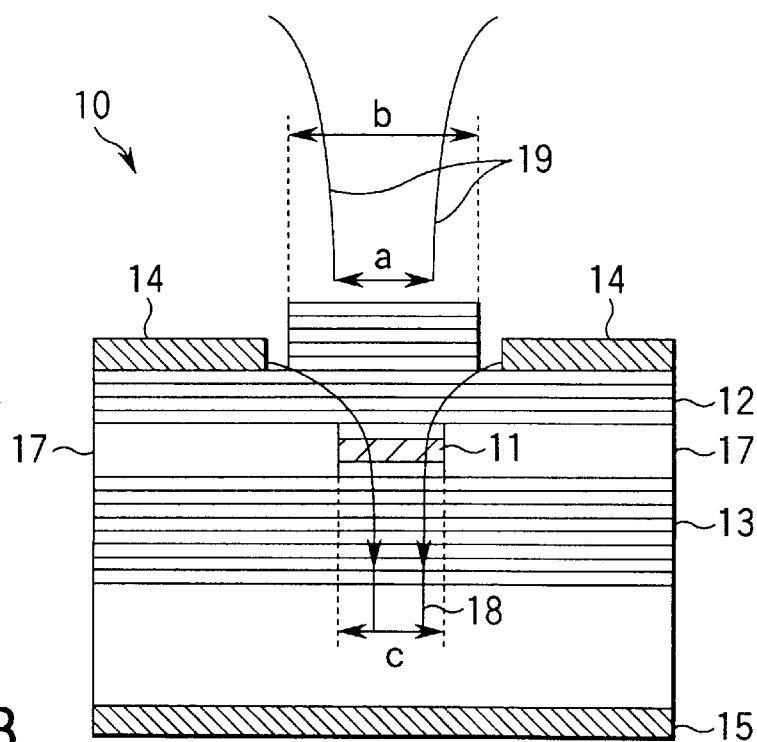
FIG. 33B is a cross-sectional view showing the structure of a surface emitting laser according to second modification of the invention.

FIGS. 33A and 33B show structures of surface-emitting lasers 10 according to first and second modifications of the invention. The basic structure of the surface-emitting lasers 10 according to the modifications is the same as that of the surface-emitting laser 10 shown in FIG. 1, and thus the common structural elements are denoted by like reference numerals and a detailed description thereof is omitted.

In the surface-emitting lasers 10 shown in FIGS. 33A and 33B, part or all of the multi-layer thin-film mirror 12 is processed in a mesa-shape, and the upper electrode 14 is formed to surround the mesa-portion of the multi-layer thin-film mirror 12. Curves 19 in the figures indicate light beams emitted from the surface-emitting laser 10.

In the surface-emitting laser 10 (see FIG. 33A) according to the first modification, part of the active layer 11 is made insulative. As a result, an electric current 18 flowing from the upper electrode 14 through the active layer 11 to the lower electrode 15 is restricted in a region slightly wider than a cross-sectional area of the mesa portion of the multi-layer thin-film mirror 12.

The surface-emitting laser 10 according to the first modification is constructed to satisfy the relationship, $c \geq b$, where b is a cross-sectional width of the mesa portion and c is a cross-sectional width of a non-insulative portion of the active layer 11.

In the surface-emitting laser 10 having the above structure, if current is made to flow between the upper electrode 14 and lower electrode 15, the non-insulative portion of the active layer 11 emits light with high intensity and the vertically overlapping portions of the mesa portion of the multi-layer thin-film mirror 12 and the multi-layer thin-film mirror 13 function as an optical resonator with highest efficiency. Thus, the range of broadening of laser light at the emission end face of a light beam is defined by an overlapping portion of b and c, that is, b. Accordingly, the opening length. (or emission window width) a of the surface-emitting layer 10 of the first modification (see FIG. 33A) is substantially equal to b.

On the other hand, the surface-emitting layer 10 (see FIG. 33B) according to the second modification is constructed to satisfy the relationship, $c < b$, where b is a cross-sectional width of the mesa portion, and c is a cross-sectional width of a non-insulative region of the active layer 11. The other structural features are common to the surface-emitting laser 10 (see FIG. 33A) of the first modification, and a description thereof is omitted.

In the surface-emitting layer 10 having this structure, the range of broadening of laser light at the emission end face of a light beam is defined by an overlapping portion of b and c, that is, c. Accordingly, the opening length (or emission window width) a of the surface-emitting layer 10 of the second modification (see FIG. 33B) is substantially equal to c.

In surface-emitting lasers 10 having structures different from those of the first and second modifications, the opening length a indicates a dimension of the light emission end surface, which corresponds to the width of broadening of the light beam. In the description of embodiments of the invention, therefore, the width of broadening of light beam at the emission end surface is referred to as "opening length a". The width of broadening of light beam is a width of an area in a plane perpendicular to the major axis of the light beam, where the light beam has an intensity equal to $1/e^2$ (e=natural number) or more of the peak intensity. If the opening length a in the plane perpendicular to the major axis of the light beam differs depending on the direction of measurement, the value measured in the direction in which the direction of pitch p of scale 20 is projected on the light beam emission end surface is used as the opening length a. In the description of the embodiment, the word "opening", if it is simply mentioned, signifies the width of broadening of light beam on the emission end surface of the surface-emission laser 10, that is, the region corresponding to the opening length a.

The widening of the emitted light beam, which is determined by the shape and size of the opening 16, will now be described.

Figure 2:
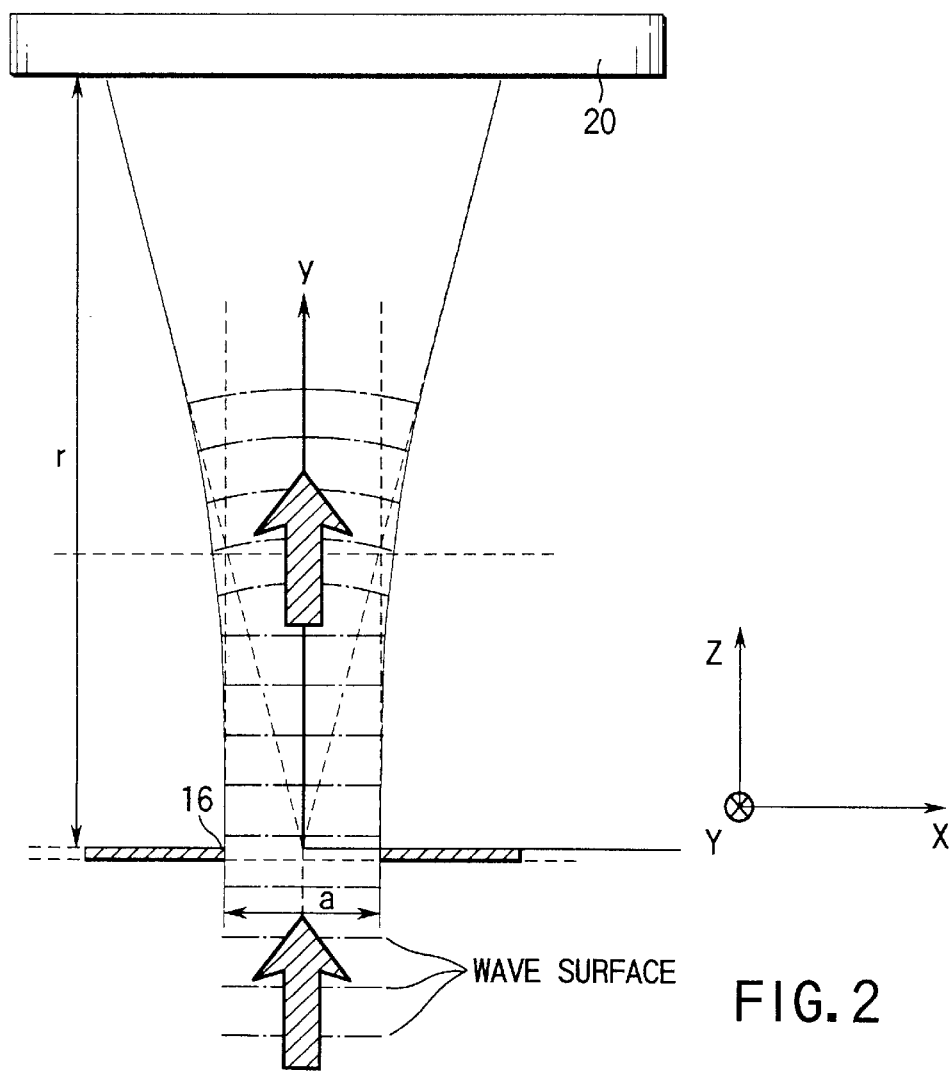
FIG. 2 shows a state in which light radiated from the opening of the surface emitting laser broadens.

A light beam emitted from the surface emitting laser 10 having a refractive index waveguide structure has substantially similar optical characteristics to those obtained when a wave surface parallel to the opening 16 corresponding in shape to an emission window is made incident, as shown in FIG. 2.

The widening of the beam, which has passed through the opening 16 can be calculated by Fresnel-Kirchhoff diffraction integration, unless the opening length (emission window width) a and the distance r between the observation plane and the opening 16 are, respectively, less than about five times the wavelength.

Specifically, if the opening function is $u_0(x_0,y_0)$ and the diffraction light on the observation plane is $u(x,y)$, the widening of the beam is expressed by $$u(x, y) = \frac{i}{\lambda} \int_{-\infty}^{\infty} u_0(x_0, y_0) \frac{\exp(-ikr)}{r} dx_0 dy_0 \qquad (1)$$

When there is a certain distance between the opening 16 and the observation plane, the widening of the beam can be calculated by Fresnel diffraction based on the following equation (2). If there is a greater distance therebetween, the widening of the beam can be calculated by Fraunhofer diffraction based on the following equation (3):

$$u(x, y) = \frac{i\exp(-ikr)}{\lambda r} \int_{-\infty}^{\infty} u_0(x_0, y_0) \cdot \exp\left[-\frac{ik}{2r}\{(x-x_0)^2 + (y-y_0)^2\}\right] dx_0 dy_0 \qquad (2)$$

$$u(x, y) = \frac{i\exp(-irk)\exp\left\{-\frac{ik}{2r}(x^2+y^2)\right\}}{\lambda r} \cdot \int_{-\infty}^{\infty} u_0(x_0, y_0)\exp\left\{\frac{ik}{r}(x_0 x + y_0 y)\right\} dx_0 dy_0 \qquad (3)$$

As has been described above, the diffraction pattern of the emission light of the surface emitting laser can be approximately calculated by using the equations (1) to (3). The equation to be used is chosen by considering the opening length (emission window width) a and the distance r between the observation plane and the opening.

In the present embodiment, it is assumed that the distance from the opening is relatively small. In the actual encoder, however, the distance between the surface emitting laser and the scale cannot infinitely be reduced, and there is a lower limit of the distance r. In fact, it is considered that the distance r is within the range within which equation (2)

holds true. In the present embodiment, therefore, the calculation was made by using equation (2).

Suppose that an opening having an opening width a in the x-axis and an infinite width in the y-axis is used, and the diffraction pattern in the x-axis is calculated. In this case, if an integration region in the y-axis is -∞ to ∞, the following equation (4) is obtained from equation (2):

$$\int_{-\infty}^{\infty} \exp\left(-\frac{ik}{2r} y_0^2\right) dy_0 = (-ir\lambda)^{1/2} \tag{4}$$

Accordingly, the following equation (5) is obtained:

$$u(x) = \sqrt{\frac{i}{\lambda r}} \exp(-ikr) \int_{-\infty}^{\infty} u_0(x_0) \exp\left\{-\frac{ik}{2r}(x-x_0)^2\right\} dx_0 \tag{5}$$

In order to actually calculate the diffraction pattern, it is necessary to perform calculations of numerical values. Specifically, Fresnel integration expressed by $$C(\alpha) = \int_0^\alpha \cos\left(\frac{\pi \alpha^2}{2}\right) d\alpha \tag{6}$$

$$S(\alpha) = \int_0^\alpha \sin\left(\frac{\pi \alpha^2}{2}\right) d\alpha \tag{7}$$

is used. If the integration region in the x-axis is -a/2 to 1/2 under the condition, $$u_0(x_0) = \begin{cases} 1 \left(-\frac{a}{2} \leq x_0 \leq \frac{a}{2}\right) \\ 0 \left(x_0 < -\frac{a}{2}, \frac{a}{2} < x_0\right) \end{cases} \tag{8}$$

the following equation is obtained:

$$u(x) = \frac{1}{\sqrt{2}} \exp(-ikr) \left[ \left\{ C\left(\sqrt{\frac{2}{\lambda r}}\left(x+\frac{a}{2}\right)\right) - C\left(\sqrt{\frac{2}{\lambda r}}\left(x-\frac{a}{2}\right)\right) \right\} - i\left\{ S\left(\sqrt{\frac{2}{\lambda r}}\left(x+\frac{a}{2}\right)\right) - S\left(\sqrt{\frac{2}{\lambda r}}\left(x-\frac{a}{2}\right)\right) \right\} \right] \tag{9}$$

The light intensity distribution is expressed by $$|u(x)|^2 = \frac{1}{2}\left[\left\{C\left(\sqrt{\frac{2}{\lambda r}}\left(x+\frac{a}{2}\right)\right) - C\left(\sqrt{\frac{2}{\lambda r}}\left(x-\frac{a}{2}\right)\right)\right\}^2 + \left\{S\left(\sqrt{\frac{2}{\lambda r}}\left(x+\frac{a}{2}\right)\right) - S\left(\sqrt{\frac{2}{\lambda r}}\left(x-\frac{a}{2}\right)\right)\right\}^2\right] \tag{10}$$

This equation is modified in accordance with the distance r form the slit, slit width a and wavelength λ. For example, if $$r = \frac{ma^2}{2\lambda} \tag{11}$$

the variable in equation (10) is expressed by $$\frac{2}{\sqrt{m}}\left(\frac{x}{a}+\frac{1}{2}\right), \frac{2}{\sqrt{m}}\left(\frac{x}{a}-\frac{1}{2}\right) \tag{12}$$

Thus, the diffraction light intensity distribution can be described, with x/a being plotted in the abscissa and m being used as a parameter.

Figure 3A:
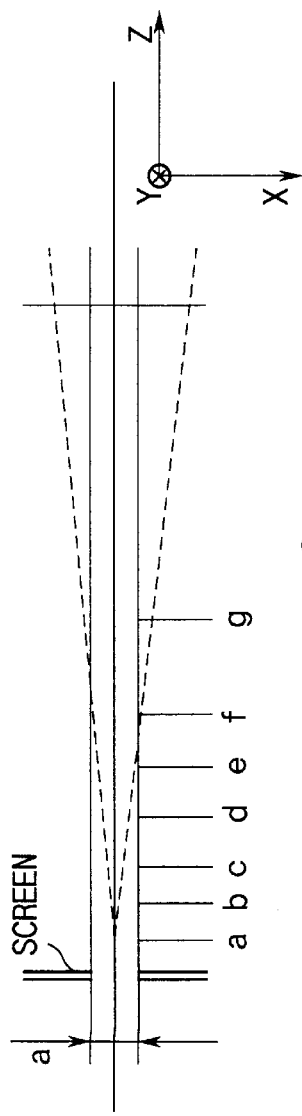
FIG. 3A shows positions for observing the intensity of diffraction light.
Figure 3B:
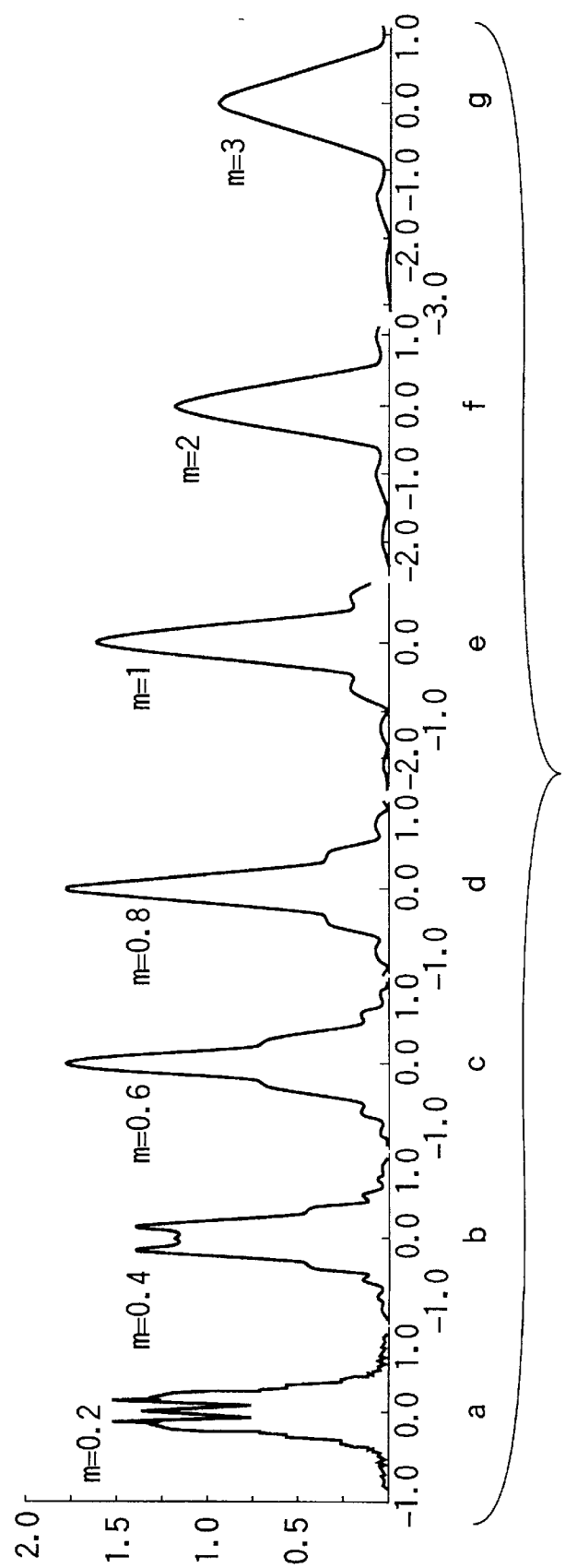
FIG. 3B shows light intensity distributions at the respective positions of observation.

FIGS. 3A and 3B show observation positions and light intensity distributions obtained by the above method.

FIG. 3A shows observation positions moving with a variation in parameter m, i.e. observation positions (a to g) for observing diffraction light intensity. In FIG. 3A, solid lines on the background of the screen indicate a geometrical shade of the slit, and broken lines indicate the widening of a diffraction pattern when m>1.

FIG. 3B shows diffraction light intensity distributions at observation positions (a to g) as calculated by equation (10). In this case, $r=ma^2/\lambda$, the abscissa indicates x/a, and the ordinate indicates the light intensity.

Symbols a to g in FIG. 3B correspond to the observation positions (a to g) of light intensity distributions shown in FIG. 3A.

An optical encoder according to the embodiment of the present invention, to which the above conditions are applied, will now be described in detail.

Figure 4:
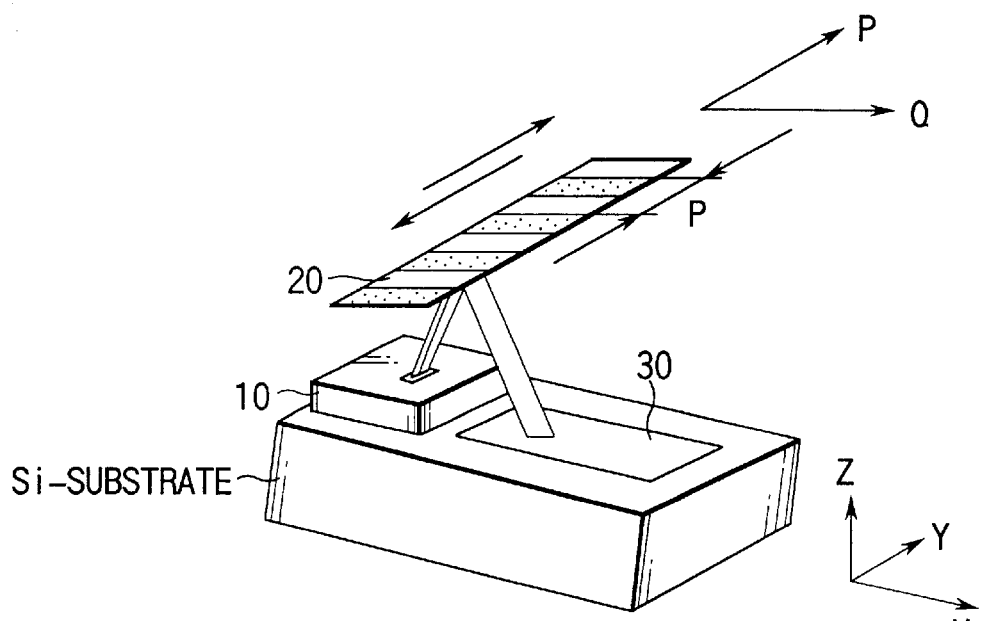
FIG. 4 is a perspective view showing the structure of an optical encoder according to an embodiment of the present invention.
Figure 5:
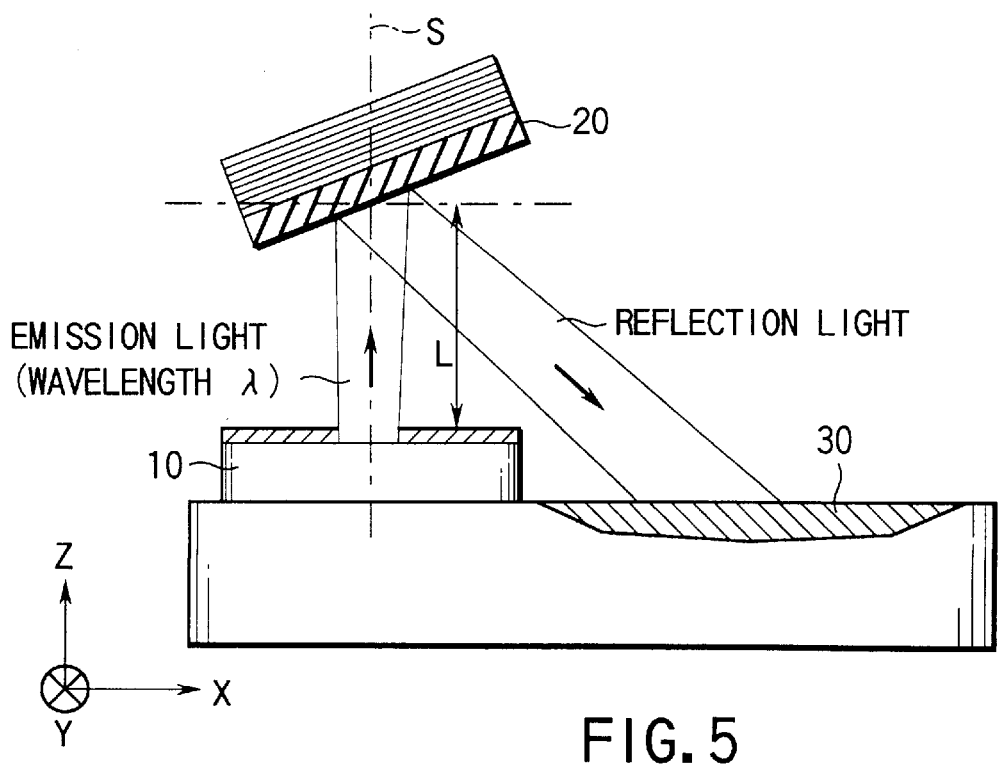
FIG. 5 is a cross-sectional view showing the structure of the optical encoder according to the embodiment of the invention.
Figure 6:
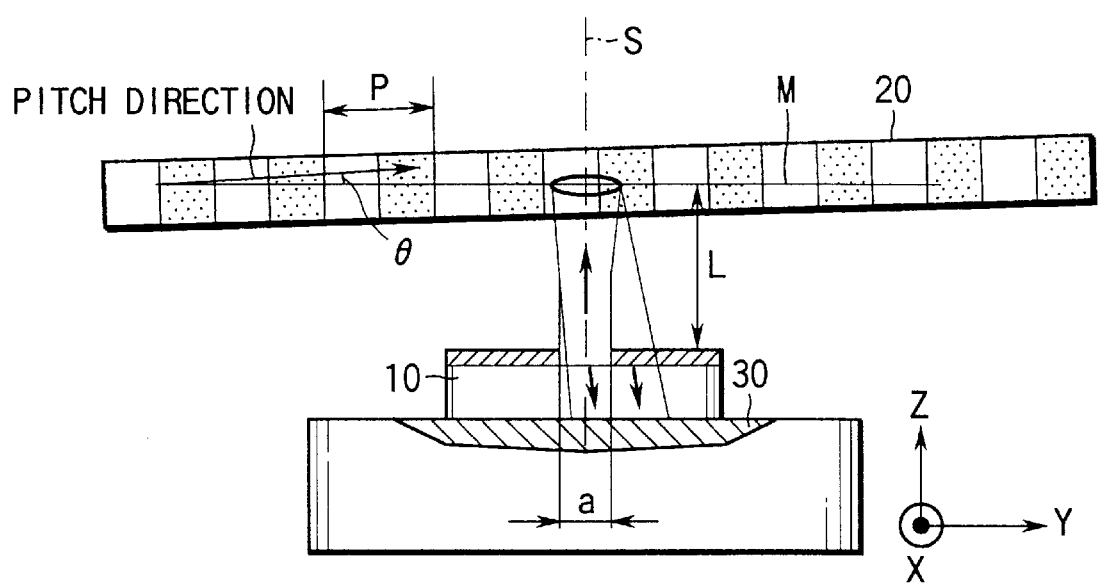
FIG. 6 is a side view showing the structure of the optical encoder according to the embodiment of the invention.

FIGS. 4 to 6 show the structure of the reflection-type encoder using the surface emitting laser 10. FIG. 4 is a perspective view showing the reflection-type encoder using the surface emitting laser 10. FIG. 5 is a cross-sectional view taken along a center axis S of the light beam and along a plane perpendicular to the y-axis. FIG. 6 is a side view showing the encoder, as viewed in the direction of x-axis. A scale 20 comprises portions with a high reflectance (or transmittance) and portions with a low reflectance (or transmittance) which are arranged alternately and regularly. The scale 20 is formed, for example, by depositing a thin film material with a high reflectance, such as Al, on a substrate with a low reflectance, such as a glass substrate, and patterning the resultant member by means of lithography.

In the above structure, a beam emitted from the surface emitting laser 10 is reflected by the scale 20, and the reflection beam is received by a photodetector 30. Since the intensity of reflection light varies with the movement of the scale 20, the amount of movement of the scale can be detected on the basis of an output from the photodetector 30.

The light intensity distribution of light radiated on the scale 20, as described above, has substantially similar optical characteristics to those obtained when a wave surface parallel to the opening 16 corresponding in shape to an emission window is made incident. Thus, the light intensity distribution can be determined by the shape and size of the opening 16 of the surface emitting laser, and the distance between the scale 20 and opening 16.

In the present embodiment, as shown in FIG. 6, a distance between the scale 20 and the light, beam emission plane of surface emitting laser 10 along the center axis S of the light beam is L; the wavelength of the light beam is λ; the scale pitch of the scale 20 is p; the angle between the pitch direction along the surface of the scale 20 and a plane M perpendicular to the center axis S of the light beam is θ; and the opening width of the light source or surface emitting laser 10 along the direction in which the pitch direction of the scale 20 is projected on the plane M perpendicular to the center axis S of the light beam is a.

The light intensity distribution in the direction in which the pitch direction of the scale 20 is projected on the plane M is now calculated by using the equation (2).

FIGS. 7A, 11A to 28A show examples of numerical calculations of light intensity distributions obtained when the surface emitting laser 10 with wavelength λ=1 μm and opening width a=30 μm is used and the distance L is varied in the range of 85.5 μm to 900 μm. In this case, r=ma²/λ, the abscissa indicates x (μm), and the ordinate indicates the light intensity(arb.).

In a case where the distance L between the scale 20 and the light emission surface is extremely small, it is not possible to approximately calculate the light intensity distribution by using equation (2). The lower limit value of the distance L, at which the equation (2) can be applied, is near the minimum value (85.5 μm) of the distance L.

The amount of reflection light, which is obtained when the spot having the light intensity distribution calculated by the above method is radiated on the scale 20, is found by integrating on the x-axis the product of the reflectance distribution of the scale 20 and the spot intensity distribution. In order to simplify calculations, it is supposed that the reflectances of the transmissive portions and reflective portions of the scale 20 are 0 and 1, respectively, and the photodetector 30 has a size enough to receive all reflection light.

Figures 7A, 7B:
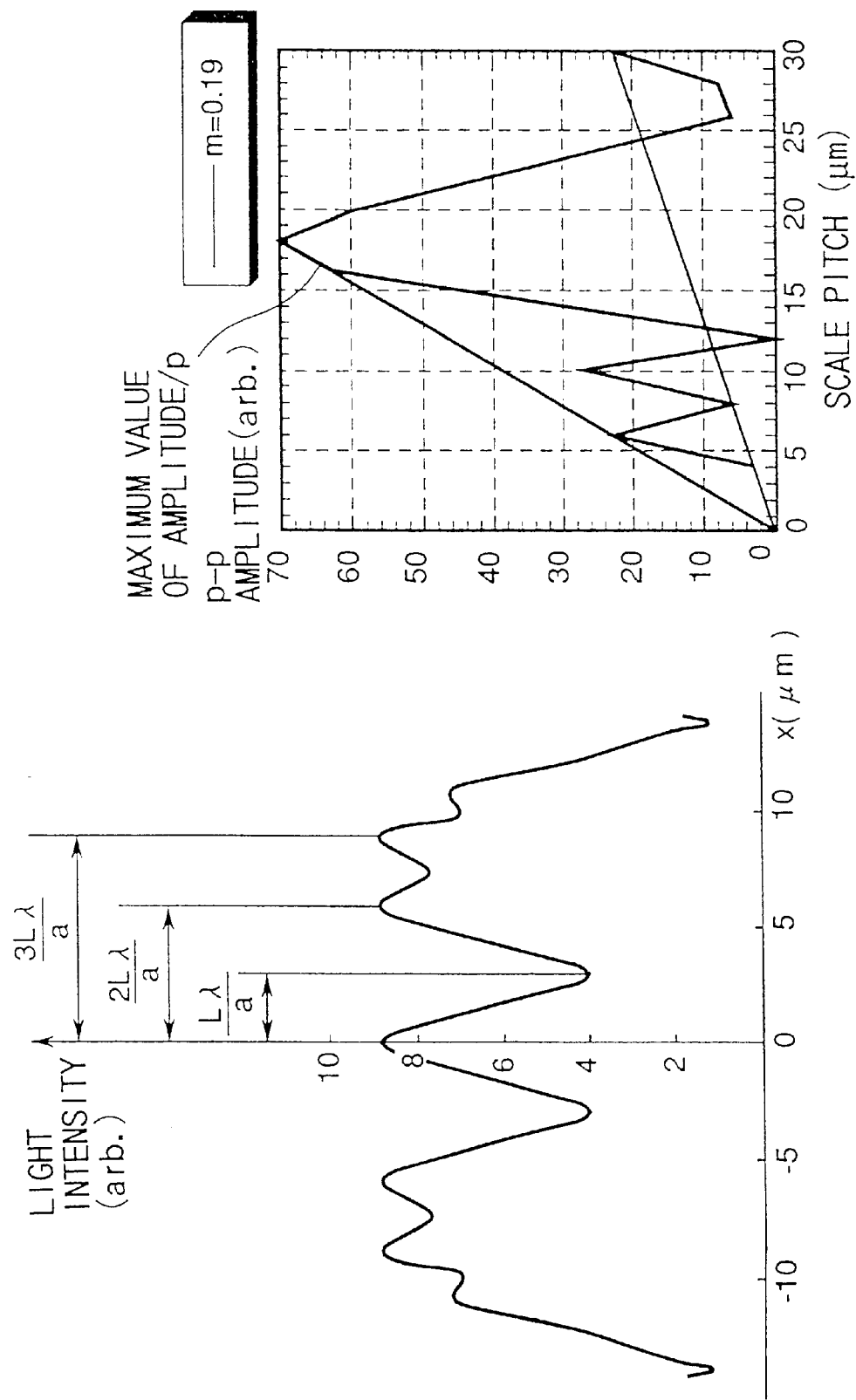
FIG. 7A is a light intensity distribution when a distance L between a movable scale and a light beam emission surface of a surface emitting laser light source on a central axis of the light beam is $L = 0.095a^2/\lambda$.
FIG. 7B is a graph showing a relationship between a scale pitch and a p—p amplitude in the case of $L = 0.095a^2/\lambda$.

A variation in light amount of reflection light, which occurs when the scale 20 is moved, is found by shifting the reflectance distribution of the scale 20. For example, a variation in reflection light amount, which occurs when the scale 20 has p=10 μm and the light intensity distribution is that shown in FIG. 7A, is obtained by calculating the product of the light intensity distribution shown in FIG. 7A and each of the reflectance distributions obtained, as shown in FIGS. 8A to 8E, when the reflectance of the scale 20 is shifted, and integrating the calculated values. In other words, by summing the hatched areas in each of FIGS. 8A to 8E, the reflection light amount of each scale position is obtained.

FIG. 9 shows a variation in reflection light amount, which occurs when the scale 20 is shifted by one pitch (10 μm). The characteristics shown in FIG. 9 correspond to those of an encoder signal obtained while the scale is moved, and a difference between the maximum and minimum of the reflection light amount corresponds to an p—p amplitude (hereinafter referred to as "amplitude") of the encoder signal. In FIG. 9, points (a) to (e) correspond to signals obtained in the states shown in FIGS. 8A to 8E.

FIG. 7B shows calculation results of the amplitudes of encoder signals obtained when the light intensity distribution is that shown in FIG. 7A and the scale 20 with a scale pitch p decreasing in units of 2 μm from 30 μm which is equal to the opening width has been moved.

As is clear from FIG. 7B, when the light intensity distribution and scale pitch p satisfy a specific relationship (in this case, p=10 μm, 14 μm≦p≦22 μm), an amplitude greater than the amplitude obtained when p=a is obtained. According to the optical encoder of the present embodiment, therefore, the scale pitch p can be made lower than that obtained with the conventional optical encoder. In other words, even when the distance L between the surface emitting laser 10 and scale 20 is less than a predetermined value (a²/λ), the relationship of p≦a is satisfied and the encoder having a higher resolution than the conventional encoder is obtained.

In order to understand the relationship between the scale pitch p and amplitude in greater detail, FIGS. 10A to 10D show the relationships between the light intensity distribution and scale pitch with respect to the maximum amplitudes p=6 μm and p=18 μm in FIG. 7B. As is clear from FIGS. 10A to 10D, when the amplitude is high, adjacent reflective portions (or transmissive portions) of the scale 20 are located at positions at which or near which maximum values of the light intensity distribution appear.

In the case of p=6 μm (see FIG. 10A), the reflective portions of the scale 20 substantially coincide with a central maximum value, first maximum values on both sides of the central maximum value, and third maximum values on both sides of the central maximum value. Specifically, the reflective portions of the scale 20 substantially coincide in position with the five maximum values. In this case, the reflection light amount (i.e. sum of hatched areas) is considerably great. On the other hand, when the scale 20 has moved by a half pitch (3 μm) (see FIG. 10B), the five maximum values correspond in position to the transmissive portions of the scale 20 and thus the reflection light amount decreases. As has been described above, the difference between the maximum value and the minimum value of the reflection light amount while the scale 20 is moving corresponds to the amplitude of the encoder signal. Accordingly, when p=6 μm, a large amplitude is obtained.

On the other hand, when p=18 μm (see FIG. 10D), the reflective portions of the scale 20 cover all the first, second and third maximum values on both sides of the central maximum value. Accordingly, the reflection light amount increases, and when the scale has moved by a half pitch (see FIG. 10C), a large amplitude is obtained from the difference between the maximum and minimum values of the reflection light amount.

As has been stated above, in order to obtain a large amplitude, it should suffice, in general, to determine the scale pitch p so that the portions of the same phase (e.g. reflective portions) of the scale 20 are substantially located at positions where the maximum values of the light intensity distribution appear (i.e. so that the distance between the maximum values may be equal to an integer number of times of scale pitch p). However, since the profile of the light intensity distribution is not necessarily symmetric, the distance between the maximum values is not always equal to an integer number of times of scale pitch p. There are some cases where a greater amplitude is obtained because of the presence of some error.

When the encoder is actually used, a higher resolution is generally obtained by further electrically dividing, e.g. a pseudo-sine-wave signal obtained on the basis of the reflection light from the scale 20. When the higher resolution of the encoder is considered, it is thus necessary to optimize the resolution by means of, e.g. signal division. Since the number of divisions, which can be obtained when the encoder signal is supplied, is considered to be proportional to the amplitude of the encoder signal, the resolution can be increased by decreasing the scale pitch p while maintaining the amplitude of the encoder signal.

It can be thought that a minimum resolution is obtained at a point in FIG. 7B where the value of the amplitude/p (an inclination of a straight line connecting a plotted point and the original point) takes a maximum value. If this idea is applied to the measured results of amplitude in FIG. 7B, the amplitude/p takes maximum values near p=6 μm and p=16–18 μm.

It is also understood that as compared to the conventional optical encoder (p=30 μm), the range in which high resolution is obtained covers plotted points appearing above the line connecting the point of p=30 μm and the original point in FIG. 7B. That is, higher resolutions than the prior art are obtained in the ranges, 6 μm≦p≦10 μm, and 14 μm≦p ; 24 μm. Specifically, if the signal division is considered, high resolution is obtained if the value of amplitude/p is great, even if the absolute value of amplitude is low, as compared to the case of p=30 μm.

If the amplitude of the encoder signal in relation to each scale pitch p is similarly calculated with respect to the light intensity distributions shown in FIGS. 11A to 28A, the results as shown in FIGS. 11B to 28B are obtained. In FIGS. 11B to 25B, higher resolutions are obtained in the range of p<a than in the range of p=a. In FIG. 26B, the condition of p=a is an almost optimal condition for obtaining a high resolution. In FIGS. 27B and 28B, it appears that optimal conditions are present in the range of p>a. At least, the optimal condition is p=a in the range of p≦a.

Figure 31:
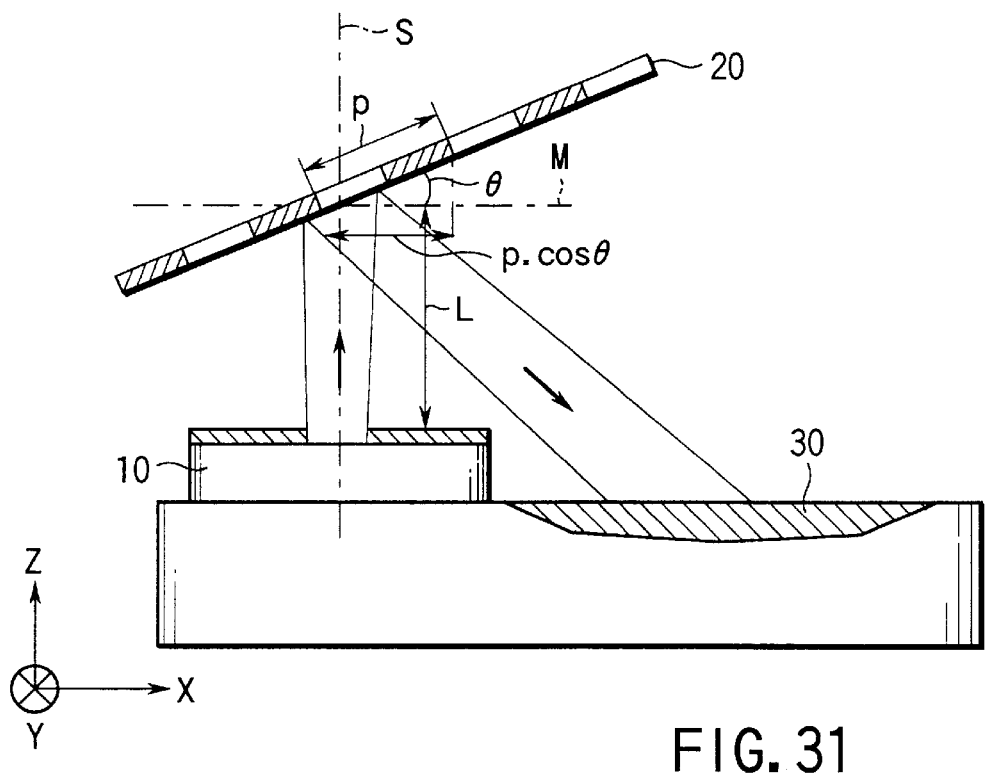
FIG. 31 is a view for explaining an angle θ defined between a scale pitch direction and a plane perpendicular to a central axis of a light beam.
Figure 32:
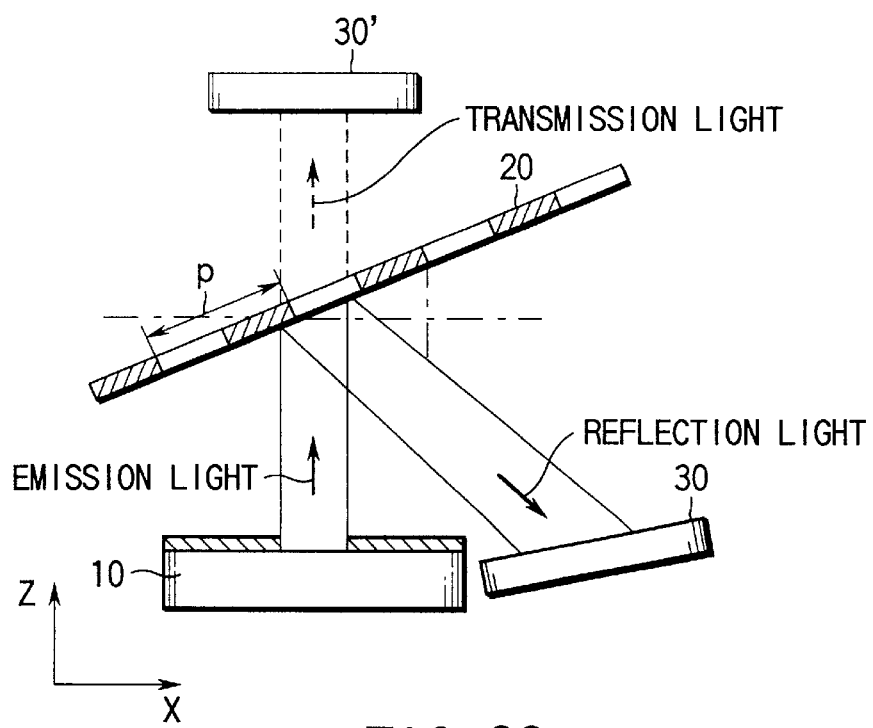
FIG. 32 shows the structure of a conventional optical encoder.

In the above description, it has been supposed that θ=0. In the case of 0≠0, as shown in FIG. 31, the condition for optimal resolution can be determined if it is supposed that the value of p·cos θ obtained when the scale pattern is projected onto the plane M perpendicular to the center axis S of the light beam is an equivalent scale pitch p. When θ=0, p·cos θ=p and thus all optical conditions can be expressed by using p·cos θ.

As is clear from the above, when the surface emitting laser 10 and scale 20 are situated relatively close to each other, the condition for optimizing the resolution is obtained in the range of p·cos θ<a.

A description will now be given of the ranges for obtaining optimal conditions in various cases based on the value of L (i.e. various cases in which parameter m is varied).

Figures 12A, 12B:
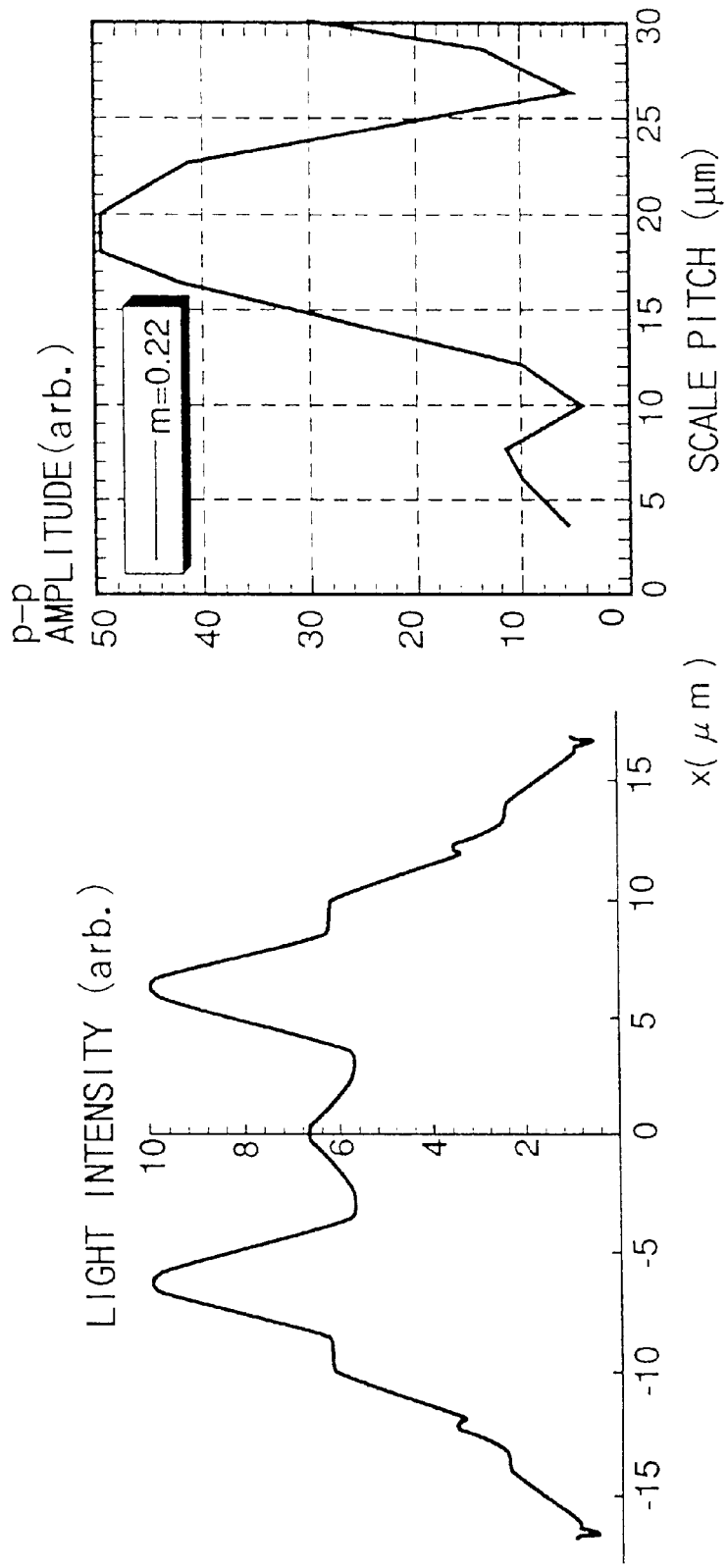
FIG. 12A is a light intensity distribution in the case of $L=0.11a^2/\lambda$.
FIG. 12B is a graph showing a relationship between a scale pitch and a p—p amplitude in the case of $L=0.11a^2/\lambda$.

① In the case of L=0.095$a^2$/λ to 0.11$a^2$/λ (see FIGS. 7A, 11A and 12A), FIG. 7A shows a light intensity distribution when L=0.095$a^2$/λ, FIG. 11A shows a light intensity distribution when L=0.1$a^2$/λ, and FIG. 12A shows a light intensity distribution when L=0.11$a^2$/λ.

As is shown in FIG. 7A, when L=0.095$a^2$/λ, a maximum value of light amount appears on the optical axis, and minimum values of light amount appear at points of Lλ/a on both sides of the optical axis. In addition, maximum values appear near points of 2Lλ/a, 3Lλ/a and 4Lλ/a on both sides of the optical axis.

If the value L is increased from this state, the light intensity of the maximum value on the optical axis gradually decreases, as shown in FIG. 11A. When the value L is close to L=0.11$a^2$/λ, as shown in FIG. 12A, the maximum value on the optical axis almost disappears. As regards the maximum values at distances 2Lλ/a, 3Lλ/a and 4Lλ/a, the light intensities greatly decrease except for the case of 2Lλ/a.

As has been described above, in the range of 0.095$a^2$/λ≦L≦0.11$a^2$/λ, maximum values on the optical axis and at distance 2Lλ/a from the optical axis are dominant. It is considered that large amplitudes are obtained when the portions of the scale having the same phase (e.g. reflective portions) are located near these maximum values.

With reference to FIGS. 7B, 11B and 12B, the condition for obtaining the high resolution on the basis of the above idea can be expressed by 1.6Lλ/a≦p·cos θ≦2.4Lλ/a
(0.095$a^2$/λ≦L≦0.11$a^2$/λ)

Figures 13A, 13B:
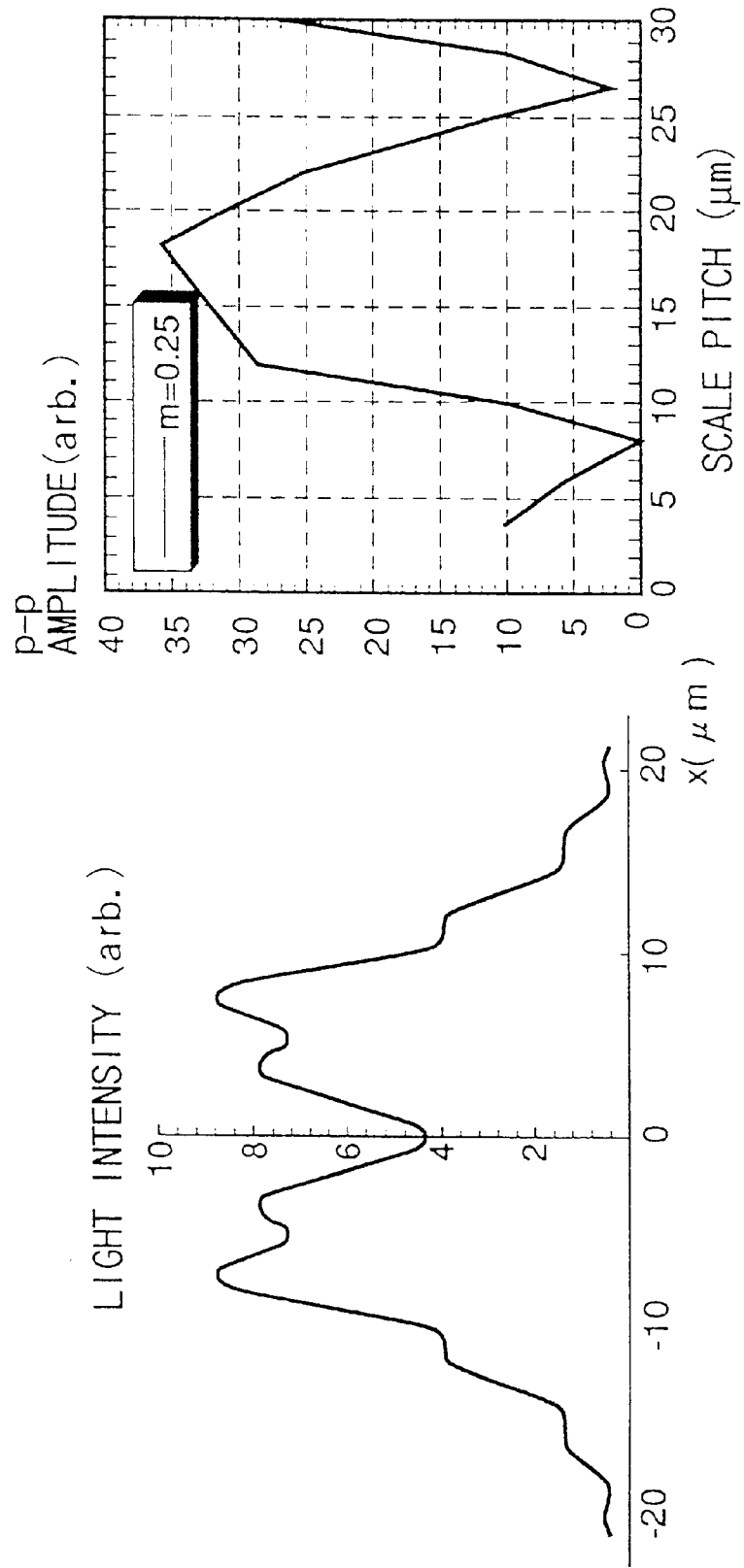
FIG. 13A is a light intensity distribution in the case of $L=0.125a^2/\lambda$.
FIG. 13B is a graph showing a relationship between a scale pitch and a p—p amplitude in the case of $L=0.125a^2/\lambda$.
Figures 14A, 14B:
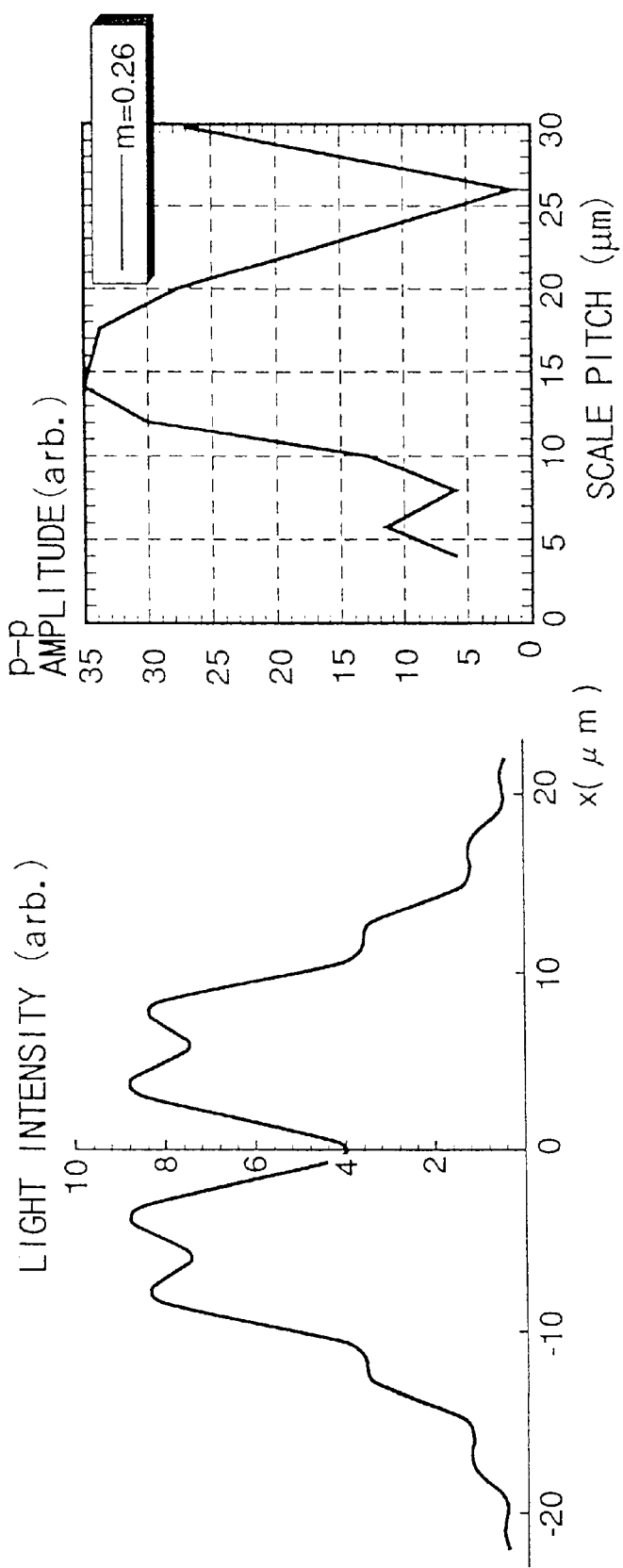
FIG. 14A is a light intensity distribution in the case of $L=0.13a^2/\lambda$.
FIG. 14B is a graph showing a relationship between a scale pitch and a p—p amplitude in the case of $L=0.13a^2/\lambda$.

② In the case of 0.095$a^2$/λ≦L≦0.13$a^2$/λ (see FIGS. 7A, 11A through 14A), FIG. 7A shows a light intensity distribution when L=0.095$a^2$/λ, FIG. 11A shows a light intensity distribution when L=0.1$a^2$/λ, FIG. 12A shows a light intensity distribution when L=0.11$a^2$/λ, FIG. 13A shows a light intensity distribution when L=0.125$a^2$/λ, and FIG. 14A shows a light intensity distribution when L=0.13$a^2$/λ.

In the range of 0.095$a^2$/λ≦L≦0.11$a^2$/λ, the diffraction pattern varies, as described in the above section ①. If the value L is further increased, as shown in FIG. 13A, the maximum value on the optical axis disappears, while the minimum values on both sides of the optical axis at the distance Lλ/a become maximum values and the light intensity increases. Although the maximum values on both sides of the optical axis at distances 2Lλ/a, 3Lλ/a and 4Lλ/a are observed, the light intensity thereof decreases.

If the distance L is further increased, as shown in FIG. 14A, the maximum values at distance Lλ/a from the optical axis become dominant near the value L=0.13$a^2$/λ. The light intensity at this time is higher than that obtained at the previously dominant maximum values of distance 2Lλ/a.

As has been described above, in the range of 0.095$a^2$/λ≦L≦0.13$a^2$/λ, at least the maximum values at distance 2Lλ/a from the optical axis are dominant. It is considered that large amplitudes are obtained when the portions of the scale having the same phase (e.g. reflective portions) are located near these maximum values.

With reference to FIGS. 7B, 11B through 14B, the condition for obtaining the high resolution on the basis of the above idea can be expressed by 4.6Lλ/a≦p·cos θ≦7.4Lλ/a
(0.095$a^2$/λ≦L≦0.13$a^2$/λ)

Figures 15A, 15B:
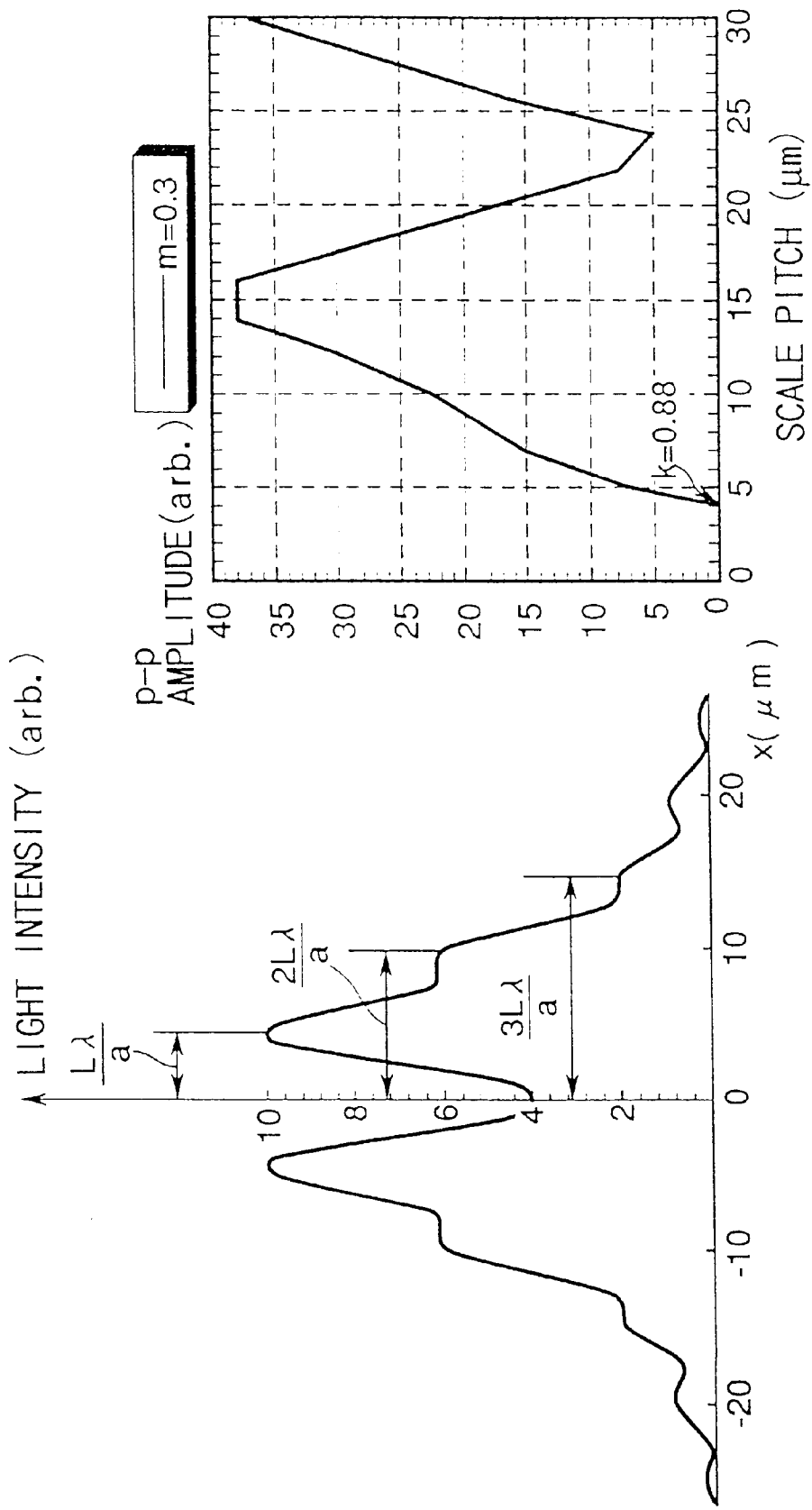
FIG. 15A is a light intensity distribution in the case of $L=0.15a^2/\lambda$.
FIG. 15B is a graph showing a relationship between a scale pitch and a p—p amplitude in the case of $L=0.15a^2/\lambda$.
Figures 16A, 16B:
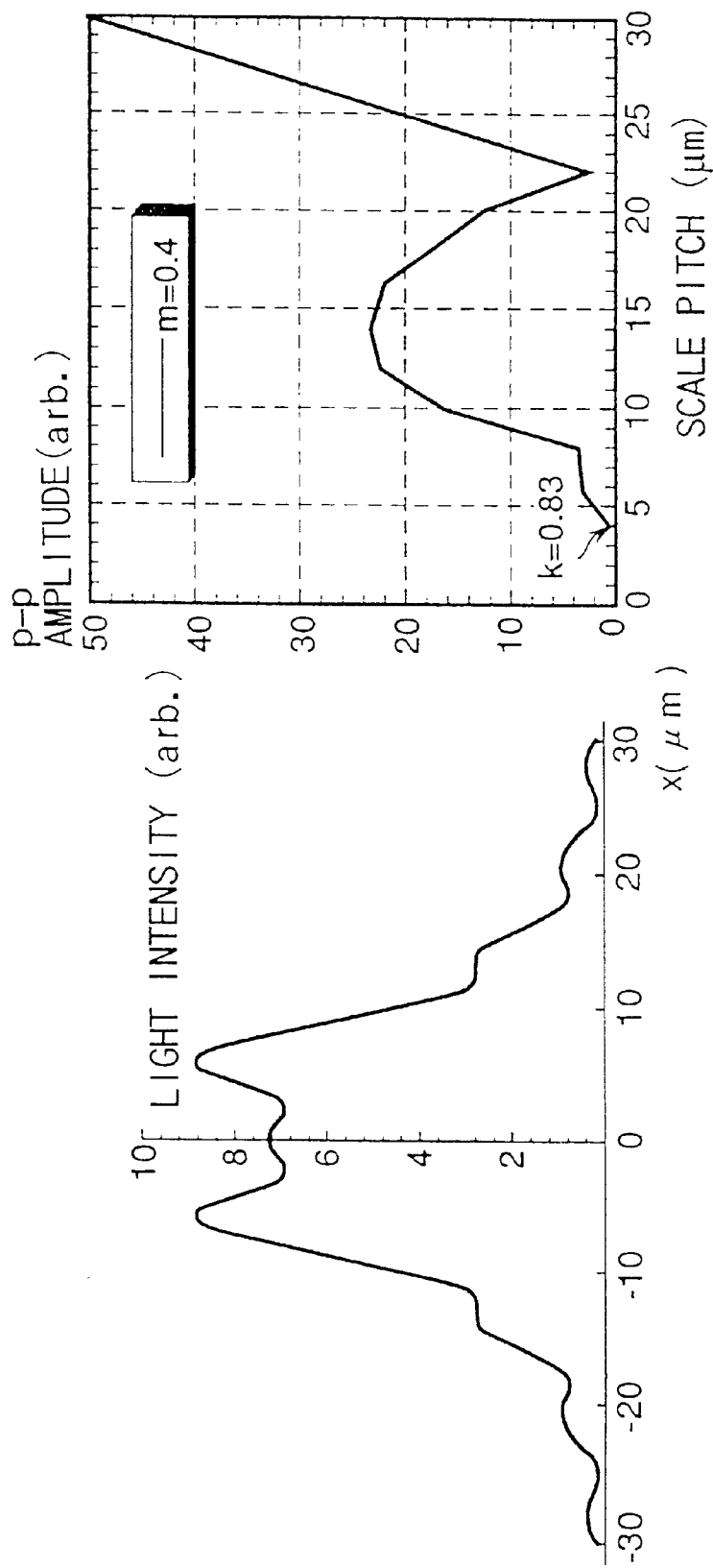
FIG. 16A is a light intensity distribution in the case of $L=0.2a^2/\lambda$.
FIG. 16B is a graph showing a relationship between a scale pitch and a p—p amplitude in the case of $L=0.2a^2/\lambda$.
Figures 17A, 17B:
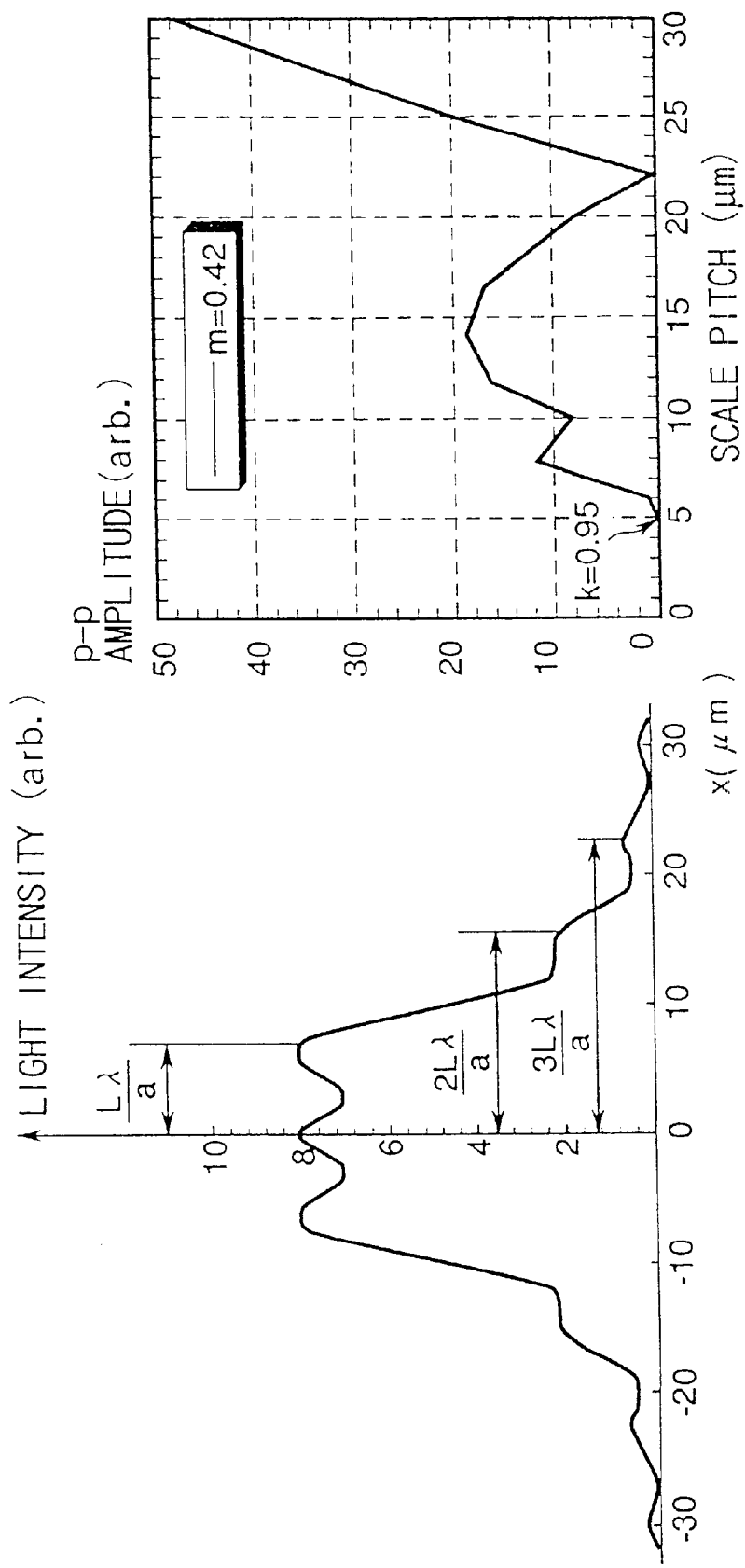
FIG. 17A is a light intensity distribution in the case of $L=0.21a^2/\lambda$.
FIG. 17B is a graph showing a relationship between a scale pitch and a p—p amplitude in the case of $L=0.21a^2/\lambda$.

③ In the case of 0.13$a^2$/λ≦L≦0.21$a^2$/λ (see FIGS. 14A through 17A), FIG. 14A shows a light intensity distribution when L=0.13$a^2$/λ, FIG. 15A shows a light intensity distribution when L=0.15$a^2$/λ, FIG. 16A shows a light intensity distribution when L=0.2$a^2$/λ, FIG. 17A shows a light intensity distribution when L=0.21$a^2$/λ, and FIG. 14A shows a light intensity distribution when L=0.13$a^2$/λ.

If the value L is increased from L=0.13$a^2$/λ, as shown in FIG. 15A, the maximum values at distance Lλ/a on both sides of the optical axis become once dominant. However, if the value L is further increased, a maximum value appears on the optical axis, as shown in FIG. 16A. At a region near L=0.21$a^2$/λ, as shown in FIG. 17A, the maximum value of light intensity on the optical axis becomes substantially equal to the maximum values at distance Lλ/a on both sides of the optical axis.

As has been described above, in the range of 0.13$a^2$/λ≦L≦0.21$a^2$/λ, the maximum values at distance Lλ/a on both sides of the optical axis are dominant. It is considered that large amplitudes are obtained when the portions of the scale having the same phase (e.g. reflective portions) are located near these maximum values.

With reference to FIGS. 14B to 17B, the condition for obtaining the high resolution on the basis of the above idea can be expressed by 2Lλ/a≦p·cos θ≦4Lλ/a
(0.13$a^2$/λ≦L≦0.21$a^2$/λ)

Figures 18A, 18B:
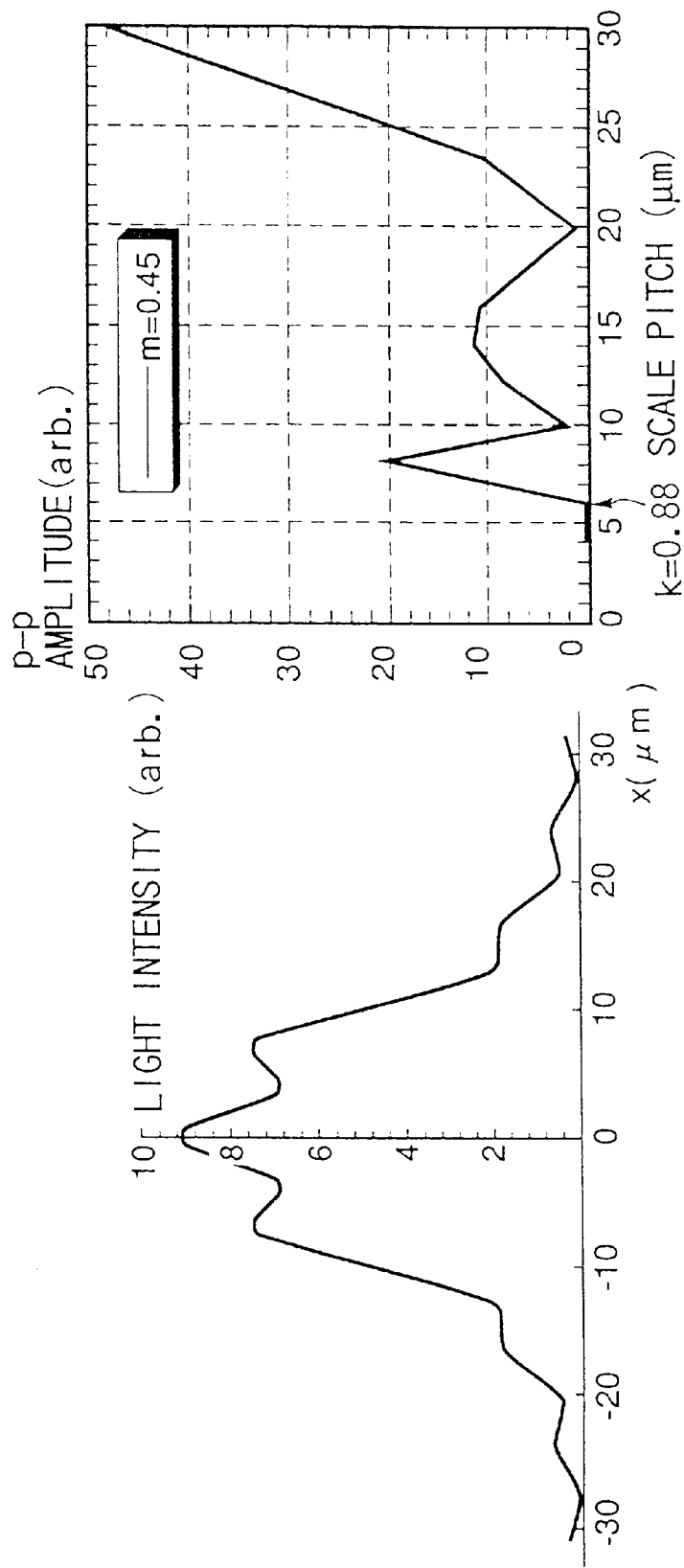
FIG. 18A is a light intensity distribution in the case of $L=0.225a^2/\lambda$.
FIG. 18B is a graph showing a relationship between a scale pitch and a p—p amplitude in the case of $L=0.225a^2/\lambda$.
Figures 19A, 19B:
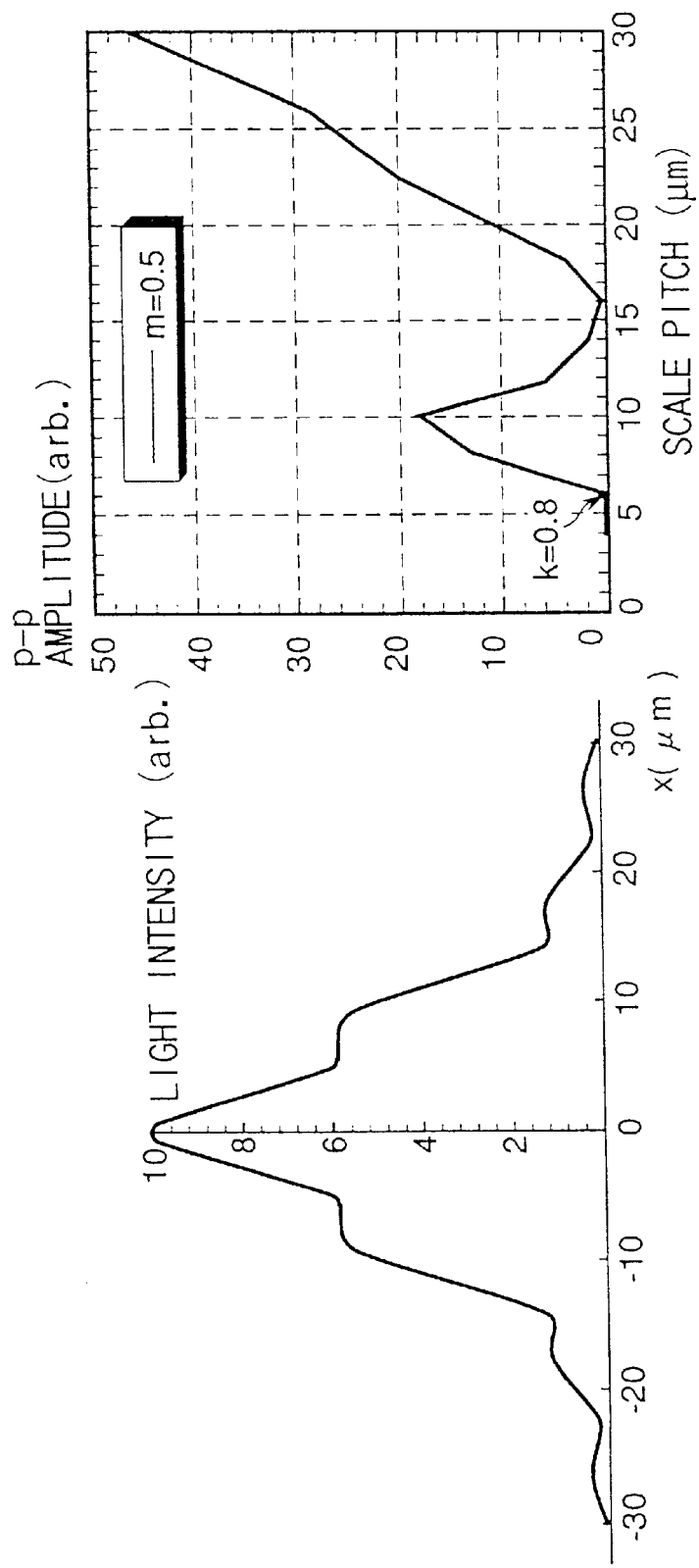
FIG. 19A is a light intensity distribution in the case of $L=0.25a^2/\lambda$.
FIG. 19B is a graph showing a relationship between a scale pitch and a p—p amplitude in the case of $L=0.25a^2/\lambda$.
Figures 20A, 20B:
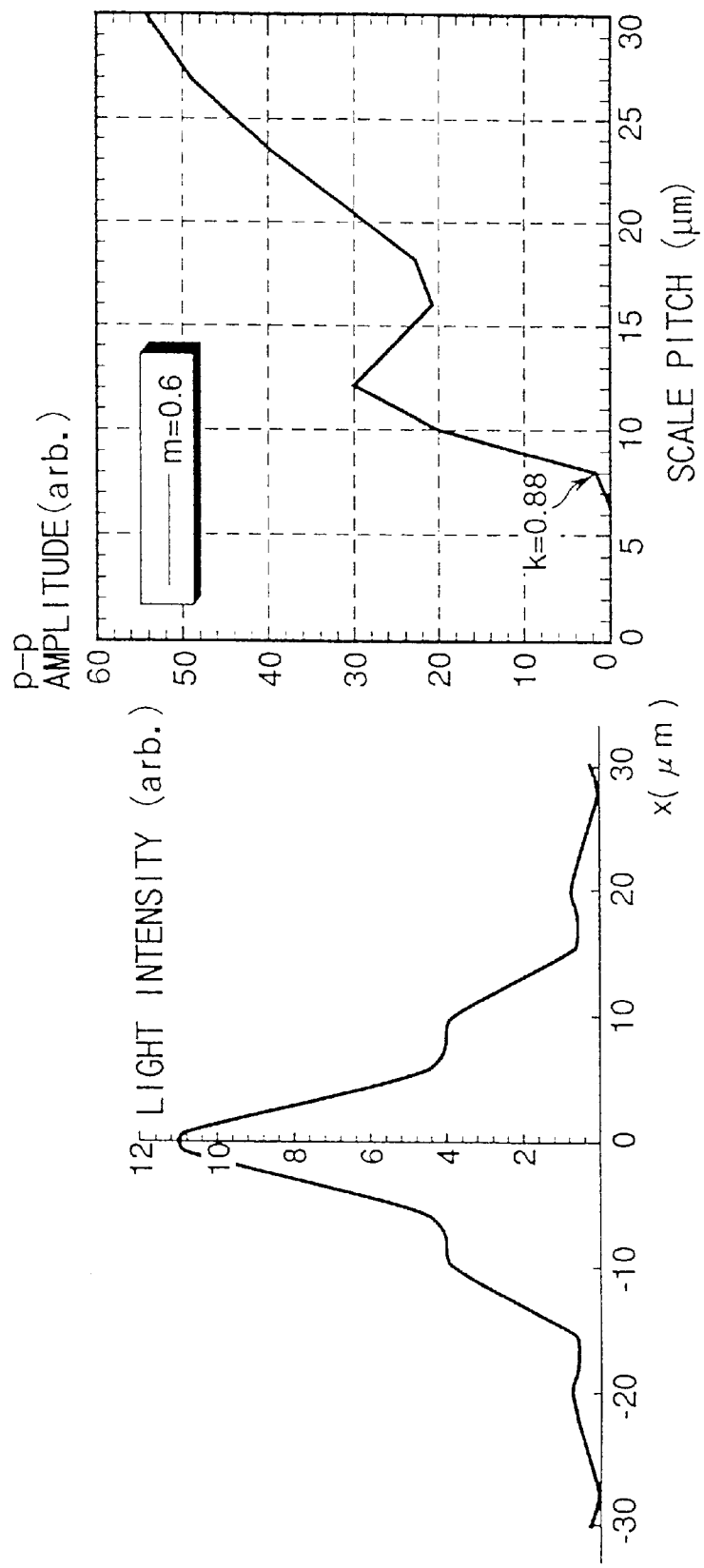
FIG. 20A is a light intensity distribution in the case of $L=0.3a^2/\lambda$.
FIG. 20B is a graph showing a relationship between a scale pitch and a p—p amplitude in the case of $L=0.3a^2/\lambda$.

④ In the case of 0.21$a^2$/λ≦L≦0.3$a^2$/λ (see FIGS. 17A through 20A), FIG. 17A shows a light intensity distribution when L=0.21$a^2$/λ, FIG. 18A shows a light intensity distribution when L=0.225$a^2$/λ, FIG. 19A shows a light intensity distribution when L=0.25$a^2$/λ, and FIG. 20A shows a light intensity distribution when L=0.3$a^2$/λ.

If the value L is increased from L=0.21$a^2$/λ, as shown in FIGS. 17A to 20A, the maximum value of light intensity appears once again on the optical axis and becomes dominant. On the other hand, the maximum values at distance Lλ/a on both sides of the optical axis decrease gradually and, as shown in FIG. 20A, almost disappear in a region near L=0.3$a^2$/λ.

As has been described above, in the range of 0.21$a^2$/λ≦L≦0.3$a^2$/λ, the maximum value on the optical axis is dominant. However, the maximum values at distance Lλ/a on both sides of the optical axis cannot be ignored. It is thus considered that large amplitudes are obtained when the portions of the scale having the same phase (e.g. reflective portions) are located near these three maximum values.

Figures 21A, 21B:
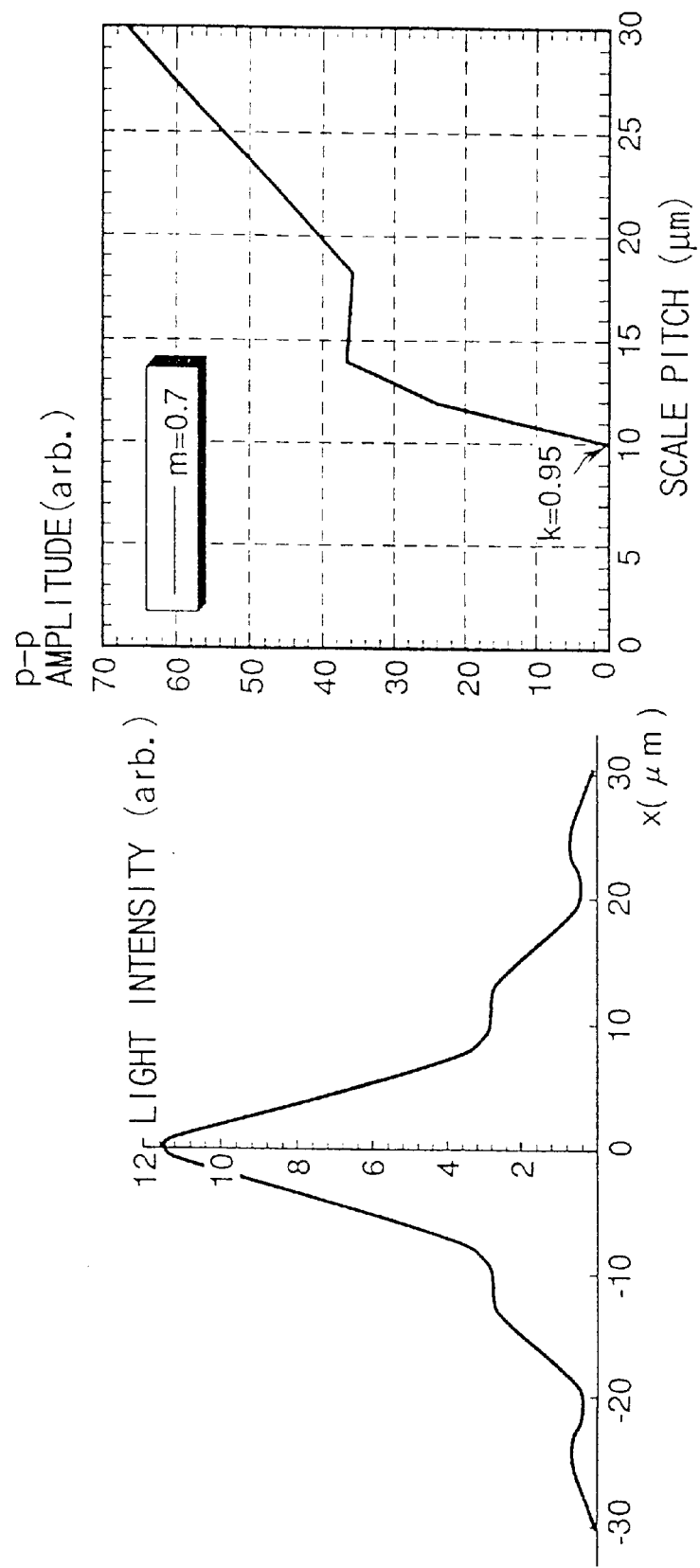
FIG. 21A is a light intensity distribution in the case of $L=0.35a^2/\lambda$.
FIG. 21B is a graph showing a relationship between a scale pitch and a p—p amplitude in the case of $L=0.35a^2/\lambda$.
Figures 22A, 22B:
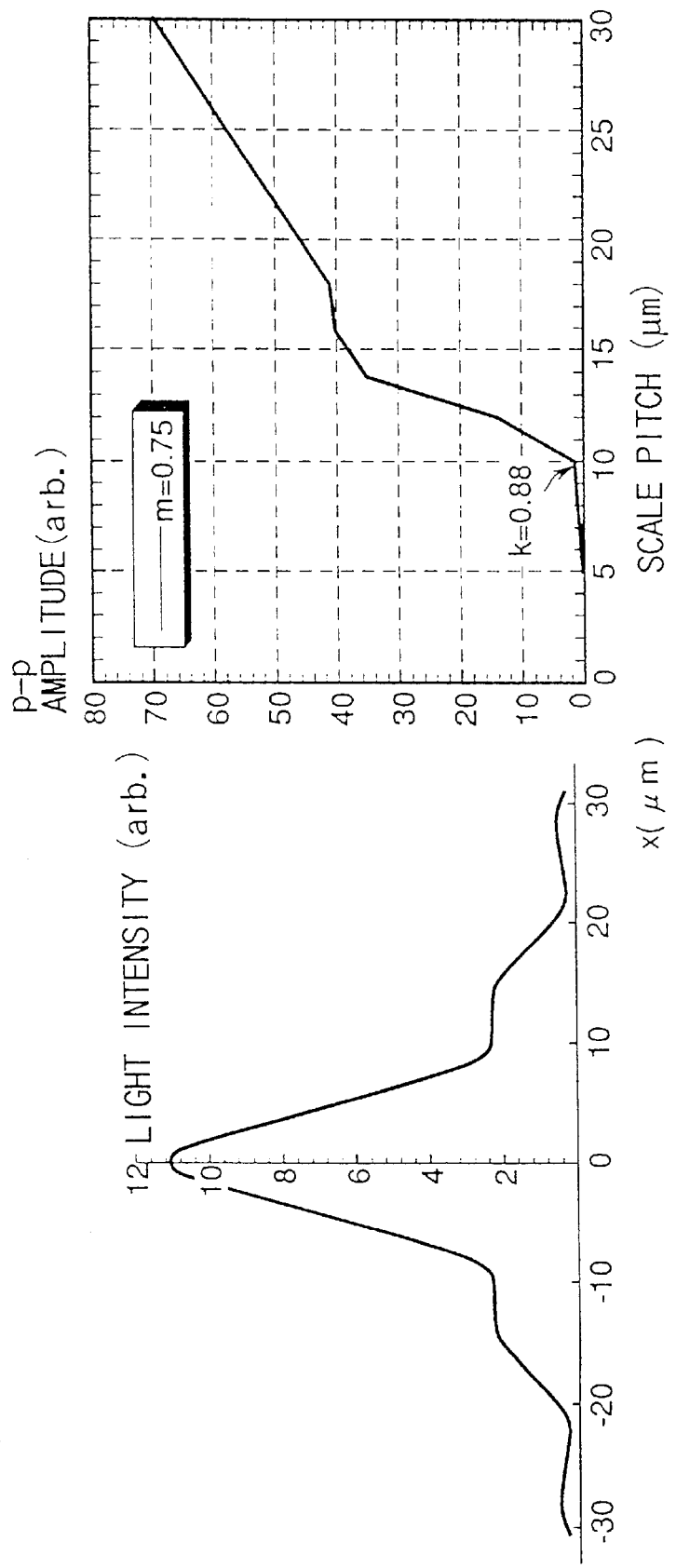
FIG. 22A is a light intensity distribution in the case of $L=0.375a^2/\lambda$.
FIG. 22B is a graph showing a relationship between a scale pitch and a p—p amplitude in the case of $L=0.375a^2/\lambda$.
Figures 23A, 23B:
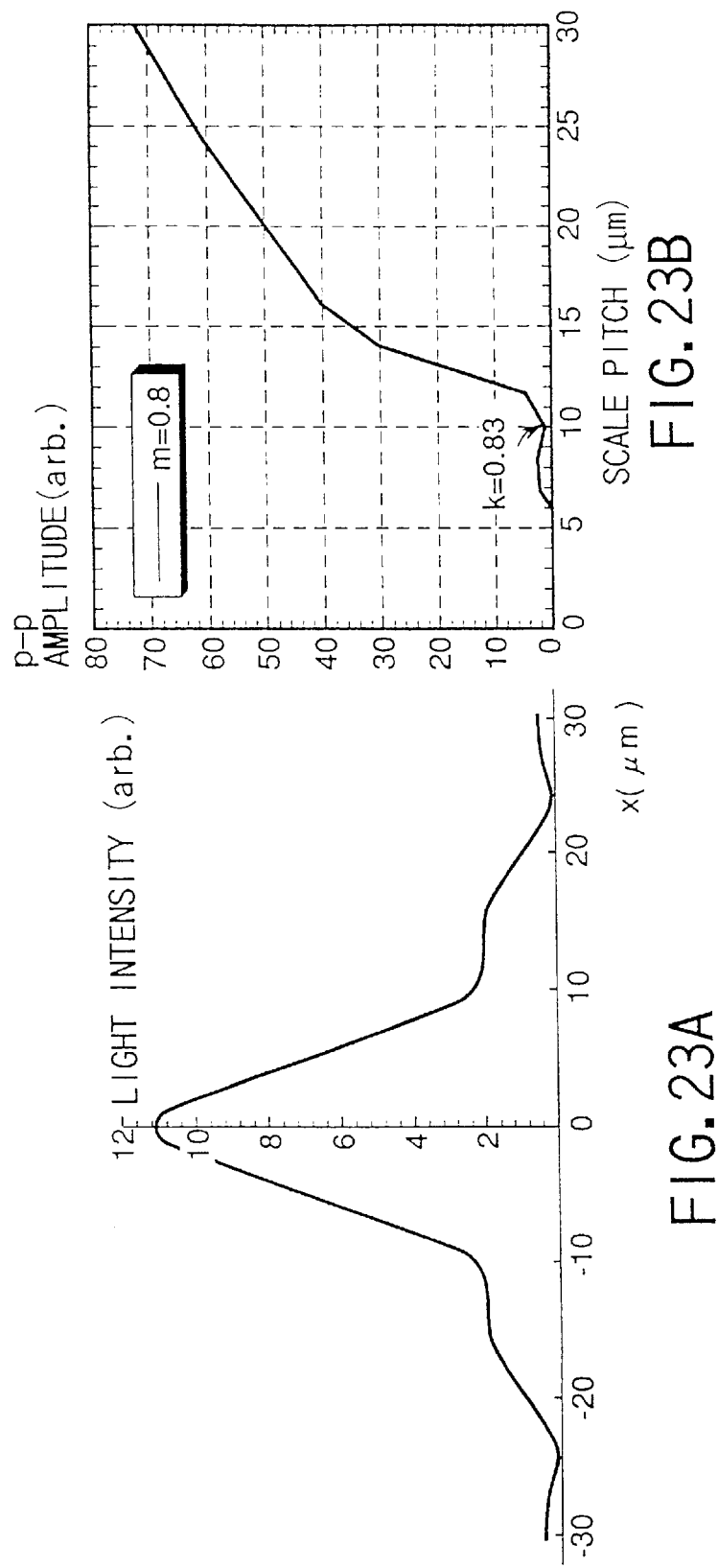
FIG. 23A is a light intensity distribution in the case of $L=0.4a^2/\lambda$.
FIG. 23B is a graph showing a relationship between a scale pitch and a p—p amplitude in the case of $L=0.4a^2/\lambda$.
Figures 25A, 25B:
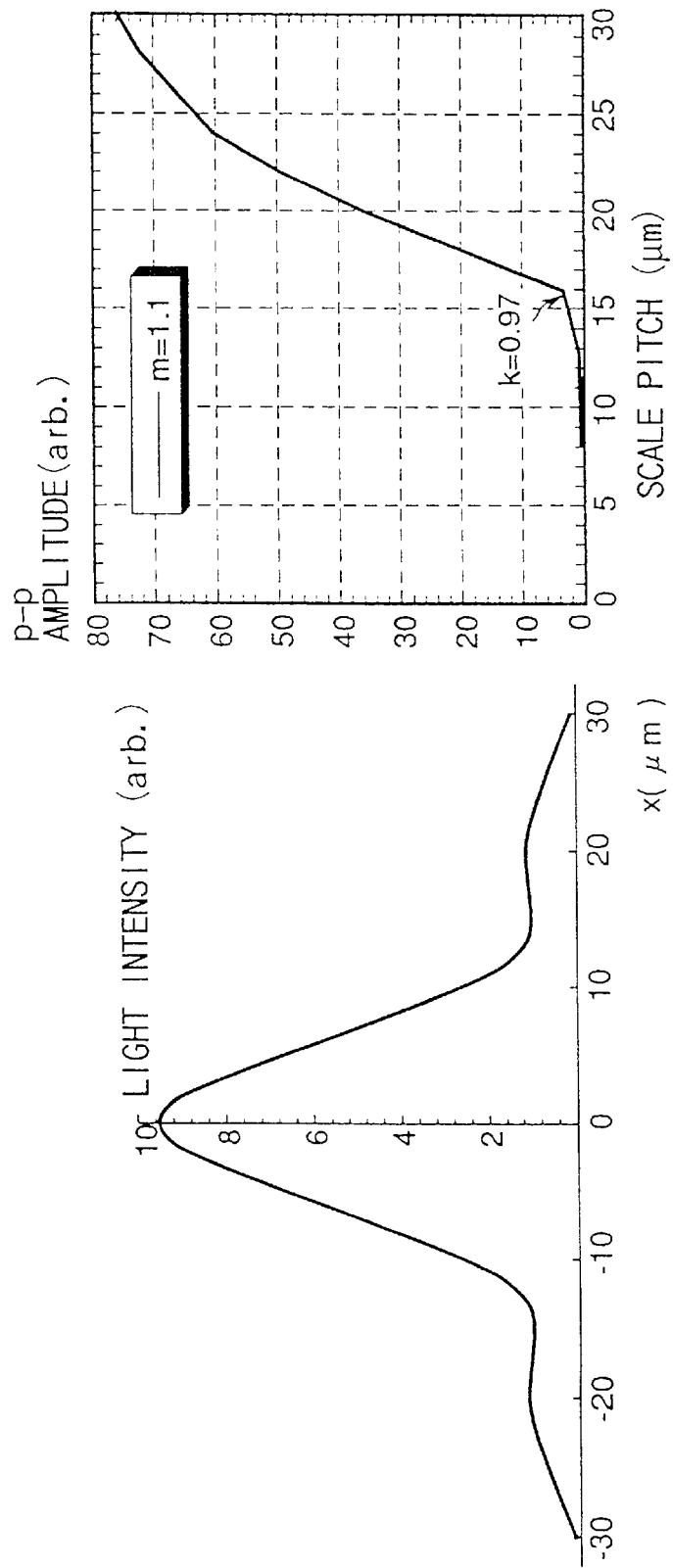
FIG. 25A is a light intensity distribution in the case of $L=0.55a^2/\lambda$.
FIG. 25B is a graph showing a relationship between a scale pitch and a p—p amplitude in the case of $L=0.55a^2/\lambda$.
Figures 26A, 26B:
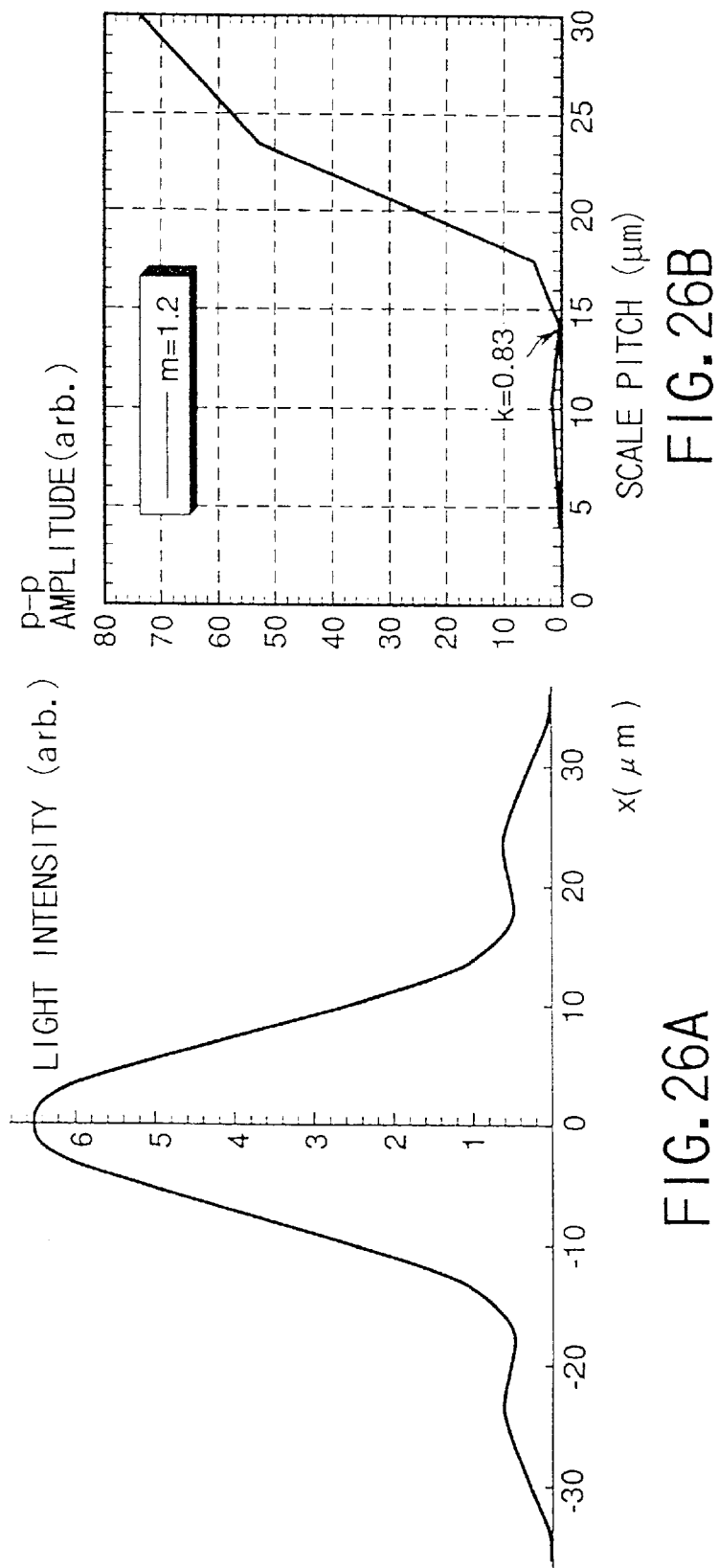
FIG. 26A is a light intensity distribution in the case of $L=0.6a^2/\lambda$.
FIG. 26B is a graph showing a relationship between a scale pitch and a p—p amplitude in the case of $L=0.6a^2/\lambda$.
Figures 27A, 27B:
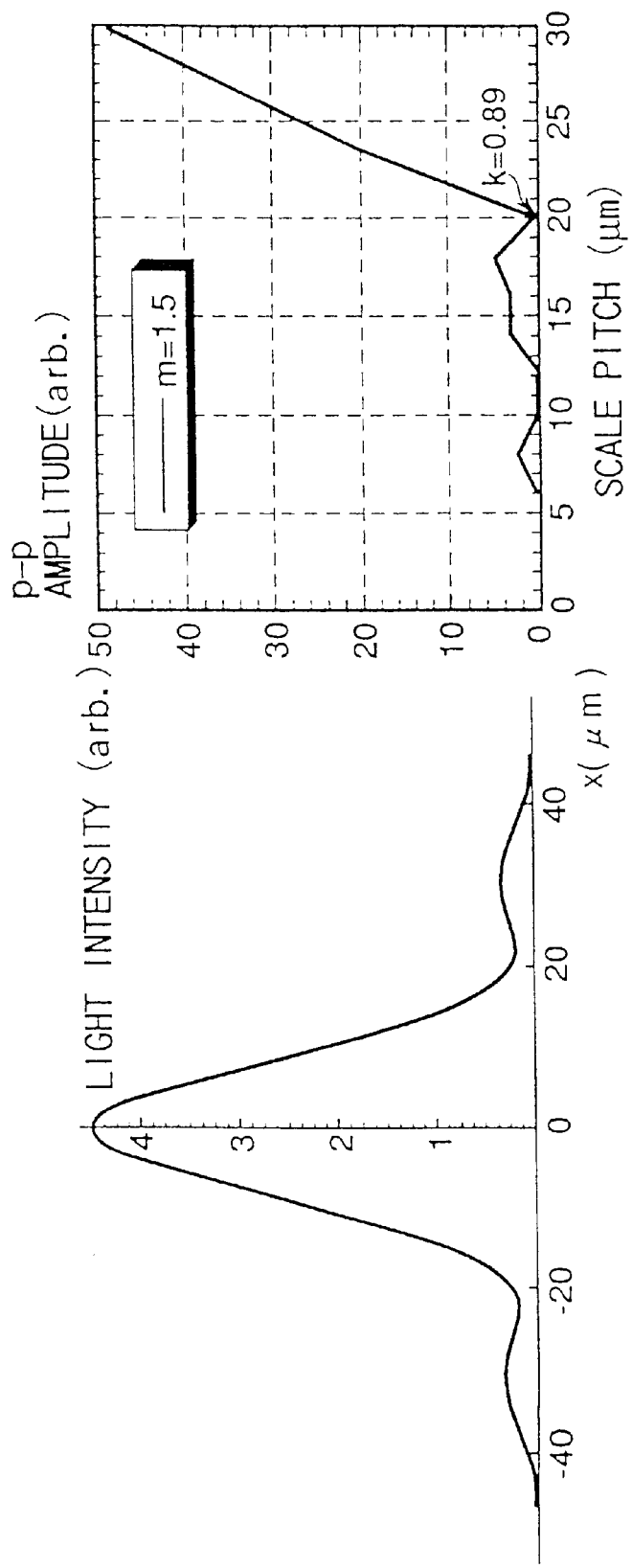
FIG. 27A is a light intensity distribution in the case of $L=0.75a^2/\lambda$.
FIG. 27B is a graph showing a relationship between a scale pitch and a p—p amplitude in the case of $L=0.75a^2/\lambda$.
Figures 28A, 28B:
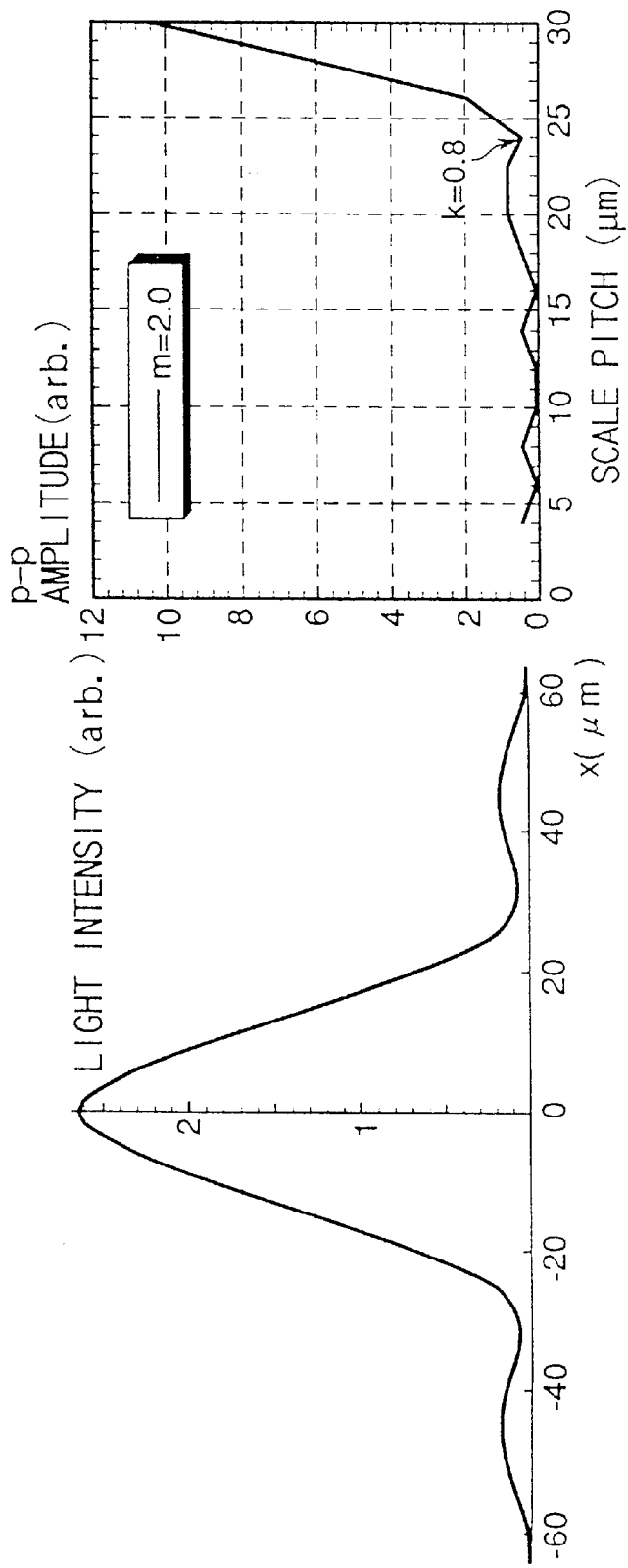
FIG. 28A is a light intensity distribution in the case of $L=1.0a^2/\lambda$.
FIG. 28B is a graph showing a relationship between a scale pitch and a p—p amplitude in the case of $L=1.0a^2/\lambda$.

With reference to FIGS. 17B to 20B, the condition for obtaining the high resolution on the basis of the above idea can be expressed by $1.1L\lambda/a \leq p.\cos\theta \leq 1.6L\lambda/a$ $(0.21a^2/\lambda \leq L \leq 0.3a^2/\lambda)$ 5 In the case of $0.3a^2/\lambda \leq L$ (see FIGS. 20A through 28A), FIG. 20A shows a light intensity distribution when $L=0.3a^2/\lambda$, FIG. 21A shows a light intensity distribution when $L=0.35a^2/\lambda$, FIG. 22A shows a light intensity distribution when $L=0.375a^2/\lambda$, FIG. 23A shows a light intensity distribution when $L=0.4a^2/\lambda$, FIG. 24A shows a light intensity distribution when $L=0.5a^2/\lambda$, FIG. 25A shows a light intensity distribution when $L=0.55a^2/\lambda$, FIG. 26A shows a light intensity distribution when $L=0.6a^2/\lambda$, FIG. 27A shows a light intensity distribution when $L=0.75a^2/\lambda$, and FIG. 28A shows a light intensity distribution when $L=1.0a^2/\lambda$.

If the value L is increased from $L=0.3a^2/\lambda$, as shown in FIGS. 20A to 25A, minimum values appear at distance $L\lambda/a$ on both sides of the optical axis and the maximum value on the optical axis becomes more dominant. In a region exceeding $L=0.6a^2/\lambda$, as shown in FIGS. 26A to 28A, no condition for obtaining high resolution is observed if $p.\cos\theta<a$. Optimal conditions appear when $p.\cos\theta \geq a$.

As has been described above, in the range of $0.3a^2/\lambda \leq L \leq 0.6a^2/\lambda$, the maximum value on the optical axis is dominant. Thus, it should suffice if the scale pitch is optimally determined in relation to the spot width at this maximum value.

With reference to FIGS. 20B to 26B, the condition for obtaining the high resolution on the basis of the above idea can be expressed by $1.2L\lambda/a \leq p.\cos\theta<a$ $(0.3a^2/\lambda \leq L \leq 0.6a^2/\lambda)$ In the above cases of 1̂ to 5̂, it is supposed that the resolution of the encoder is determined by a quotient obtained by dividing the scale pitch p by the amplitude of the encoder signal (p/amplitude). The above descriptions were given of the case where the quotient (p/amplitude) is less than a quotient obtained when p=a. That is, the condition for obtaining a highest resolution was described.

However, the optical encoder of the present embodiment can be used even where the quotient (p/amplitude) is greater than a quotient obtained when p=a. A description will now be given of the range in which the amplitude of the encoder signal can be observed even when the quotient (p/amplitude) is not necessarily minimum.

It is understood, as mentioned above, that the scale pitch p of the encoder should be set to be substantially equal to the distance in the x-axis direction (i.e. the direction of an axis along the plane M perpendicular to the center axis of the light beam) at which a maximum value of light intensity appears. In addition, the distance in the x-axis direction at which the maximum value of light intensity appears is equal to an integer number of times of $L\lambda/a$, as shown in, e.g. FIGS. 7A, 15A and 17A. This can be proved from the theory of light diffraction.

Thus, in order to make it possible to observe the amplitude of the encoder signal, it should suffice to set the scale pitch p at an integer number of times of the distance $L\lambda/a$ in the x-axis direction at which the maximum value of light intensity appears.

In order to simplify the description, the factor k is defined as follows:

$k=p/(L\lambda/a)$

Based on this idea, the minimum value of scale pitch p should be about $L\lambda/a$ (k=about 1).

According to actual calculation results, as shown in FIGS. 11B to 28B, all ranges of scale pitch p, in which amplitudes of the encoder signal are observed, have lower limits at about k=0.8.

Accordingly, in the case of $L<1.0a^2/\lambda$, the scale pitch p at which the amplitude of the encoder signal is observed is expressed as follows, in consideration of an inclination of the beam axis with respect to the scale 20:

$0.8.L\lambda/a \leq p.\cos\theta<a$ $(L \leq 1.0a^2/\lambda)$

It is conventionally thought that when the distance L between the light source (surface emitting laser 10) and scale 20 is greater than a predetermined distance $(a^2/\lambda)$, the encoder signal cannot be obtained unless the scale pitch p is greater than $L\lambda/a$.

Figures 29A, 29B:
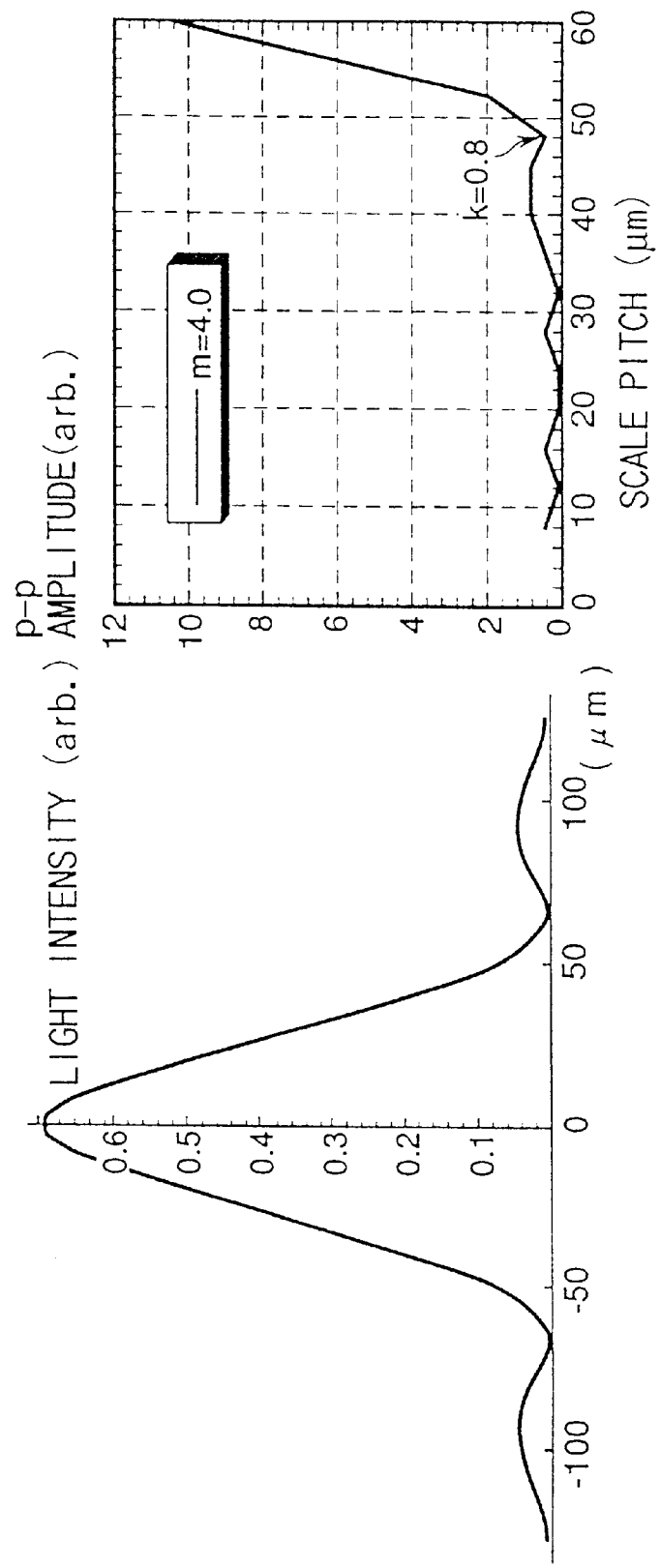
FIG. 29A is a light intensity distribution in the case of $L=2.0a^2/\lambda$.
FIG. 29B is a graph showing a relationship between a scale pitch and a p—p amplitude in the case of $L=2.0a^2/\lambda$.
Figures 30A, 30B:
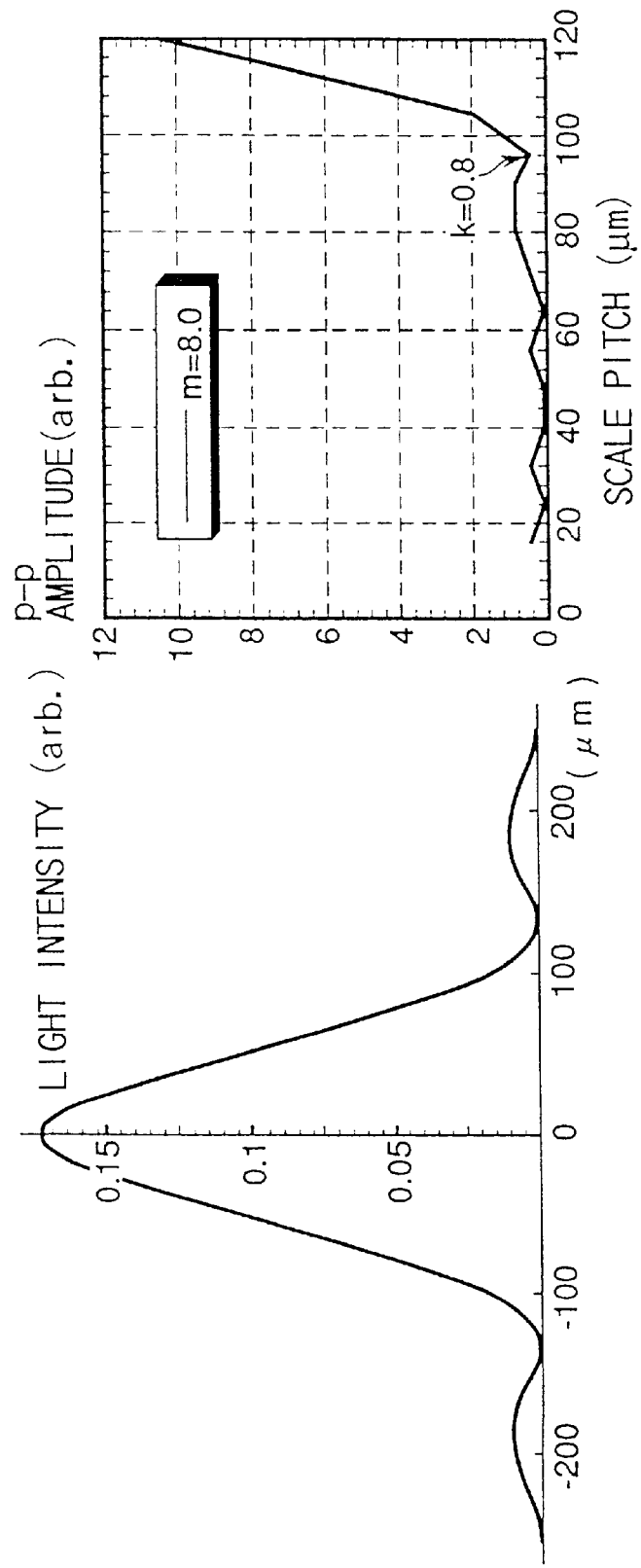
FIG. 30A is a light intensity distribution in the case of $L=4.0a^2/\lambda$.
FIG. 30B is a graph showing a relationship between a scale pitch and a p—p amplitude in the case of $L=4.0a^2/\lambda$.

However, as is obvious from FIGS. 29B and 30B, the encoder signal can be obtained even when the scale pitch p is less than $L\lambda/a$. FIG. 29A shows a light intensity distribution when $L=2.0a^2/\lambda$, and FIG. 30A shows a light intensity signal when $L=4.0a^2/\lambda$.

As is clear from FIGS. 29B and 30B, the encoder output begins to rise when the scale pitch p is $0.8L\lambda/a$. It is understood that the encoder signal can be obtained even when the scale pitch p is less than $L\lambda/a$.

Based on the above fact, the condition for obtaining the encoder output even when the distance L between the light source (surface emitting laser 10) and scale 20 is greater than $a^2/\lambda$ is expressed by $0.8L\lambda/a<p.\cos\theta<1.0L\lambda/a$ $(L \geq 1.0a^2/\lambda)$ In the conventional optical encoder used under the condition, $p.\cos\theta \geq a$, when $L \leq a^2/\lambda$, and under the condition, $p.\cos\theta \geq L\lambda/a$, when $L>a^2/\lambda$, the scale pitch p which can be used is limited. However, in the present embodiment, the scale having a pitch p, which meets the condition, $p.\cos\theta<a$, when $L \leq a^2/\lambda$ and the condition, $p.\cos\theta<L\lambda/a$, when $L \geq a^2/\lambda$, can be used. Since the optical encoder of the present embodiment permits the use of the scale having a smaller pitch than the conventional optical encoder, the number of divisions of the output signal from the encoder can be made less than that in the conventional optical encoder (or the division of the output signal from the encoder is made needless) in order to obtain a desired resolution. Therefore, the manufacture of the signal processing circuit is facilitated.

In the present embodiment, the reflection type encoder has been described. However, this invention is similarly applicable to a transmission type encoder.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical encoder comprising a movable scale movable relative to a surface emitting laser light source, the surface emitting laser light source for illuminating part of the movable scale, and a photodetector for receiving a light beam which has been reflected by or passed through the movable scale, wherein in a case where a distance between the movable scale and a light beam emission plane of the surface emitting laser light source along a center axis of the light beam is L, a wavelength of the light beam is $\lambda$, a scale pitch of the movable scale is p, an angle between a pitch direction of the movable scale and a plane perpendicular to the center axis of the light beam is $\theta$, and an opening width of the surface emitting laser light source along a direction in which the pitch direction of the movable scale is projected on the plane perpendicular to the center axis of the light beam is $\underline{a}$, a relationship, $p \cdot \cos \theta < a$, is satisfied when $L \leq 1.0a^2/\lambda$.

2. The optical encoder according to claim 1, wherein when $L \leq 1.0a^2/\lambda$, a relationship, $0.8L\lambda/a \leq p \cdot \cos \theta < a$, is satisfied.

3. The optical encoder according to claim 2, wherein when $0.095a^2/\lambda \leq L \leq 0.11a^2/\lambda$, a relationship, $1.6L\lambda/a \leq p \cdot \cos \theta \leq 2.4L\lambda/a$, is satisfied.

4. The optical encoder according to claim 2, wherein when $0.095a^2/\lambda \leq L \leq 0.13a^2/\lambda$, a relationship, $4.6L\lambda/a \leq p \cdot \cos \theta \leq 7.4L\lambda/a$, is satisfied.

5. The optical encoder according to claim 2, wherein when $0.13a^2/\lambda \leq L \leq 0.21a^2/\lambda$, a relationship, $2L\lambda/a \leq p \cdot \cos \theta \leq 4L\lambda/a$, is satisfied.

6. The optical encoder according to claim 2, wherein when $0.21a^2/\lambda \leq L \leq 0.3a^2/\lambda$, a relationship, $1.1L\lambda/a \leq p \cdot \cos \theta \leq 1.6L\lambda/a$, is satisfied.

7. The optical encoder according to claim 2, wherein when $0.3a^2/\lambda \leq L \leq 0.6a^2/\lambda$, a relationship, $1.2L\lambda/a \leq p \cdot \cos \theta \leq a$, is satisfied.

8. An optical encoder comprising a movable scale movable relative to a surface emitting laser light source, the surface emitting laser light source for illuminating part of the movable scale, and a photodetector for receiving a light beam which has been reflected by or passed through the movable scale, wherein in a case where a distance between the movable scale and a light beam emission plane of the surface emitting laser light source along a center axis of the light beam is L, a wavelength of the light beam is $\lambda$, a scale pitch of the movable scale is p, an angle between a pitch direction of the movable scale and a plane perpendicular to the center axis of the light beam is $\theta$, and an opening width of the surface emitting laser light source along a direction in which the pitch direction of the movable scale is projected on the plane perpendicular to the center axis of the light beam is $\underline{a}$, a relationship, $0.8L\lambda/a \leq p \cdot \cos \theta < 1.0L\lambda/a$, is satisfied when $L \geq 1.0a^2/\lambda$.

* * * * *